(12) United States Patent  
Kamo et al.

(10) Patent No.: US 7,105,244 B2  
(45) Date of Patent: Sep. 12, 2006

(54) FUEL CELL POWER GENERATION EQUIPMENT AND A DEVICE USING THE SAME

(75) Inventors: Tomoichi Kamo, Tokai (JP); Shuichi Ohara, Hitachi (JP); Makoto Morishima, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 109 days.

(21) Appl. No.: 10/080,562

(22) Filed: Feb. 25, 2002

(65) Prior Publication Data

US 2003/0059659 A1 Mar. 27, 2003

(30) Foreign Application Priority Data

Sep. 25, 2001 (JP) .............................. 2001-291044

(51) Int. Cl.
- *H01M 2/00* (2006.01)
- *H01M 8/00* (2006.01)
- *H01M 8/10* (2006.01)

(52) U.S. Cl. .............................. 429/32; 429/12; 429/30; 429/34

(58) Field of Classification Search .................. 429/12, 429/30, 32, 34
See application file for complete search history.

(56) References Cited

U.S. PATENT DOCUMENTS

| | | | |
|---|---|---|---|
| 4,034,793 | A | 7/1977 | Okura et al. |
| 4,562,123 | A | 12/1985 | Shimizu et al. |
| 6,054,228 | A | 4/2000 | Cisar et al. |
| 6,410,180 | B1 | 6/2002 | Cisar et al. |
| 6,492,047 | B1 | 12/2002 | Peled et al. |
| 6,506,513 | B1 * | 1/2003 | Yonetsu et al. ............... 429/34 |
| 6,530,217 | B1 | 3/2003 | Yokota et al. |
| 6,766,817 | B1 | 7/2004 | da Silva |
| 2002/0182459 | A1 * | 12/2002 | Hockaday et al. ............ 429/19 |

FOREIGN PATENT DOCUMENTS

| | | |
|---|---|---|
| JP | 58-035875 | 2/1983 |
| JP | 60-62064 | 4/1985 |
| JP | 63-076284 | 4/1988 |
| JP | 3-112053 | 5/1991 |
| JP | 8-215747 | 8/1991 |
| JP | 6-29029 | 2/1994 |
| JP | 6-124720 | 5/1994 |
| JP | 9-223507 | 8/1997 |
| JP | 2000-268835 * | 9/2000 |
| JP | 2000-268836 | 9/2000 |
| JP | 2000-516014 | 11/2000 |
| JP | 2000-268836 | 1/2001 |
| JP | 2001-160407 | 6/2001 |
| WO | WO 96/29752 | 9/1996 |
| WO | WO01/54216 A2 | 7/2001 |
| WO | WO01/54220 A2 | 7/2001 |

* cited by examiner

*Primary Examiner*—Dah-Wei Yuan  
(74) *Attorney, Agent, or Firm*—McDermott Will & Emery LLP

(57) ABSTRACT

An object of the present invention is to obtain a fuel cell power generation equipment most suitable for a portable power source without requiring any auxiliary equipment such as a separator and a fluid feeder. According to the present invention, a fuel cell power generation equipment is provided, in which an anode for oxidizing fuel and a cathode for reducing oxygen are formed with an electrolyte membrane in between and liquid is used as a fuel, wherein one or more air vent holes are provided on a wall surface of a fuel container 1, multiple unit cells having an electrolyte membrane, an anode and a cathode are mounted on a wall surface of said fuel container, and the unit cells are electrically connected each other.

10 Claims, 12 Drawing Sheets

FUEL CELL POWER GENERATION EQUIPMENT AND A DEVICE USING THE SAME

BACKGROUND OF THE INVENTION

The present invention relates to a fuel cell power generation equipment comprising an anode, an electrolyte membrane, a cathode and a diffusion layer, wherein fuel is oxidized at an anode and oxygen is reduced at a cathode, in particular, compact type portable power source using liquid fuel such as methanol as a fuel and mobile electronic devices using this power source.

Recent progress in electronics technology has contributed to miniaturizations of telephone set, notebook type personal computer, audio visual devices or mobile information terminal devices, and their use is increasingly prevailing as portable electronics devices.

Heretofore, these portable electronics devices were driven by a secondary battery, and have been developed through the appearances of new type secondary batteries from sealed lead battery to Ni/Cd, Ni/hydrogen and further Li ion batteries, and modifications to more compact and light weight types and higher energy density types. In any of these secondary batteries, cell active materials to enhance an energy density or cell structure having a higher capacity have been developed and efforts have been paid to obtain a power source with longer service time per one charge.

However, secondary batteries still have many problems for a long continuous drive of portable electronics devices because charging is indispensable after consuming a certain amount of power, and a charging equipment and a relatively longer charge time are required. Now, portable electronics devices are progressing towards devices requiring a power source enabling to supply a higher output density and a higher energy density, that is, a power source with a longer continuous service time, in response to an increasing volume of information and a higher communication speed in the future. Therefore, a need for a compact power generator (a micro power generator) serviceable without charging has been heightened.

As a power source responding to such requirement, a fuel cell power source is considered. Since a fuel cell directly converts electrochemically a chemical energy of fuel to an electric energy and does not require a driving unit like in a power generator using an internal combustion engine such as a usual engine-driven generator, its realization as a compact power generator device is highly possible. A fuel cell also does not require to temporary stop an operation of equipment for charging as in a usual secondary battery, because it can continue a power generation so long as a fuel is supplied.

For these requirements, a solid polymer type of fuel cell (PEFC: Polymer Electrolyte Fuel Cell) is known as a battery with a high output density, which generates power by oxidizing hydrogen gas at an anode and reducing oxygen at a cathode using an electrolyte membrane made of a perfluorocarbon sulfonic acid based resin.

To further miniaturize this fuel cell, for example, as disclosed in JP-A-9-223507, a compact type of PEFC power generation equipment has been proposed, in which cylindrical batteries equipped with anode and cathode electrodes at inner and outer surfaces of hollow fiber type electrolyte are assembled, and hydrogen gas and air are fed to inner and outer parts of the cylinder, respectively. However, in the application to a power source for portable electronics devices, a large volume of fuel tank should be provided due to a lower volume energy density of a fuel because the fuel used is hydrogen gas.

This system also requires auxiliary equipment such as an equipment to feed a fuel gas or an oxidizing gent gas (such as air) to a power generation equipment or to humidify electrolyte membrane to maintain the cell performance, which complicates a composition of power generation system and thus the system is not sufficient to attain miniaturization.

In order to raise a volume energy density of fuel, it is effective to use a liquid fuel and to eliminate auxiliary equipment to feed a fuel or an oxidizing agent to cell to obtain a simple composition. Such example has been proposed in JP-A-2000-268835 and JP-A-2000-268836, disclosing a direct type methanol fuel cell (DMFC: Direct Methanol Fuel Cell) using methanol and water as fuels.

This power generation equipment has an anode which is arranged in a manner to contact with outer wall side of a liquid fuel container via a material to feed liquid fuel by a capillary force, and is further composed of a solid polymer electrolyte membrane and a cathode connected sequentially.

This type of power generating equipment features in a simple composition not to require any auxiliary equipment to feed a fuel and an oxidizing agent thanks to a diffusive feed of oxygen to outer surface of a cathode which is exposed to ambient air, and also in a requirement for an electrical connection only without any separator as a connecting part for unit cells when multiple cells are combined in series.

However, since an output voltage per unit cell of DMFC under load is 0.3 to 0.4 V, DMFC requires a connection of cells in series by using multiple fuel tanks attached to a fuel cell to respond to a voltage required by portable electronics. Miniaturization of power generation equipment also requires increased number of cells in series and reduction of a fuel container volume per unit cell, remaining a problem that fuel container is divided into multiple containers in response to a number of cells in series.

In addition, a continuous service becomes difficult unless some discharging mechanism is realized for a gas generated in a liquid fuel tank by an oxidation reaction at an anode with an operation of this acid type electrolyte fuel cell.

An object of the present invention is to provide a fuel cell power generation equipment easily and continuously serviceable by feeding a fuel, without charging after consumption of a certain amount of power like a secondary battery, and a system using a fuel having a high volume energy density.

Another object of the present invention is to provide a compact power source most suitable for portable use as well as portable electronics devices using the same, wherein a fuel cell power generation equipment is composed of unit cells comprising an anode, an electrolyte membrane and a cathode laminated with a separator having a conductive fluid channel structure in between to obtain a specified voltage, the power source being a compact fuel cell without having an auxiliary equipment such as a fluid feeding mechanism instead of a conventional fuel cell having a fluid feeding mechanism which enforces passing through of a fuel and an oxidizing agent gas, enabling feeding a liquid fuel to each unit cell in any position of power source, and having a discharging function for a gas oxidized and generated in an anode from a fuel container.

SUMMARY OF THE INVENTION

Summary of the present invention which attains the above described objects is as follows.

A fuel cell power generation equipment is provided in which an anode to oxidize fuel and a cathode to reduce oxygen are formed with an electrolyte membrane in between and a liquid is used as a fuel, wherein the equipment has one or more air venting hole in a wall surface of a fuel container, and multiple unit cells having an electrolyte membrane, an anode and a cathode are mounted on said wall surface of fuel container, and the unit cells are electrically connected each other.

A liquid fuel container is used as a platform, and multiple unit cells, consisting of an anode, a cathode and an electrolyte membrane, are mounted on its outer wall surface.

In particular, in the case when a relatively low current and a high voltage are required, a high voltage can be obtained by arranging multiple unit cells consisting of an anode, an electrolyte membrane and a cathode on an outer circumferential surface of a fuel container and connecting each unit cell in series or in combination of series and parallel with conductive interconnectors.

A fuel can be fed without installing auxiliary equipment to compulsively feed fuel to each unit cell, by connecting a fuel container as a platform. In this case, feeding of a fuel is further stabilized by retaining liquid fuel in a liquid fuel container and filling a material to suck up fuel by capillary force.

On the other hand, an oxidizing agent is fed by a diffusion of oxygen in air to each unit cell having a power generation part at outer wall surface of the liquid fuel container. A longer power generation can be continued by using a liquid fuel having a high volume energy density such as aqueous methanol solution as a fuel in comparison with the case when hydrogen gas is used as a fuel in the same volume of container.

By using a power source comprising a fuel cell in accordance with the present invention as a battery charger which is used to charge up secondary battery mounted cellular phone, portable personal computer, portable audio, visual equipment and other portable information terminals, during a temporary stop operation, or by using the power source directly as a built-in power source without mounting a secondary battery, it becomes possible to extend service times of these electronics devices and use continuously by feeding a fuel.

Other objects, features and advantages of the invention will become apparent from the following description of the embodiments of the invention taken in conjunction with the accompanying drawings.

EXPLANATION OF NUMERALS

1 . . . fuel container, 2 . . . mounting part of fuel cell, 3 . . . diffusion hole, 4 . . . interconnector, 5 . . . suction material for liquid fuel, 6 . . . fuel cell terminal, 7 . . . cathode current collector, 8 . . . fixing plate for fuel cell, 9 . . . MEA (electrolyte/electrode assembly), 10 . . . gasket, 11 . . . diffusion layer, 12 . . . aqueous methanol solution, 13 . . . unit cell, 15 . . . air vent hole, 16 . . . output terminal, 17 . . . fastening band, 18 . . . fuel retaining layer, 19 . . . mounting hole of air vent hole, 20 . . . insulation layer, 21 . . . electrolyte membrane, 22 . . . anode layer, 23 . . . cathode layer, 50 . . . steam separation membrane, 51 . . . air vent tube, 52 . . . air vent lid, 54 . . . rib part, 81 . . . separator, 82 . . . manifold, 83 . . . longitudinal cross-section of a separator, 84 . . . lateral cross-section of a separator, 85 . . . opening part for power generation, 86 . . . manifold opening part, 87 . . . manifold insertion part, 88 . . . channel insertion part, 89 . . . rib part, 92 . . . liner, 93 . . . sucking material, 94 . . . laminated cell, 102 . . . fuel tank, 103 . . . mounting part of fuel cell and 105 . . . cell holder.

DETAILED DESCRIPTION OF THE INVENTION

Figure 1:
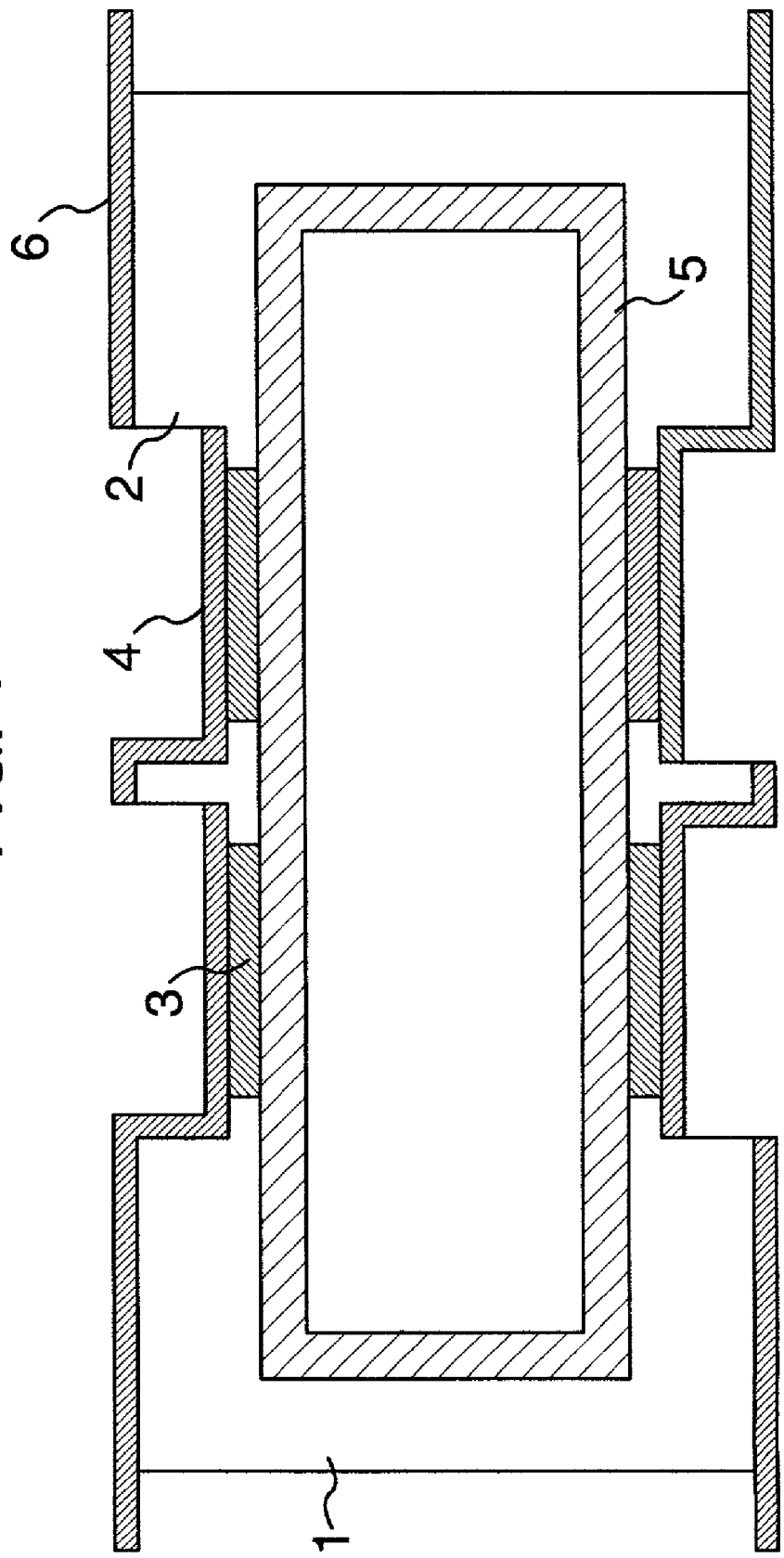
FIG. 1 is a drawing of cross-sectional structure of a fuel container of the present invention.

Typical embodiments of the present invention are explained in detail with reference to drawings. FIG. 1 is an example of cross-sectional structure of a liquid fuel container composing the present invention.

Multiple mounting parts 2 for a fuel cell having an insulating surface are fitted on an outer wall surface of a fuel container 1, and in a container wall of said mounting part 2 of fuel cell, a net-like structure, a porous layer or a slit-like diffusion hole structure 3 through which a liquid fuel sufficiently permeates is formed in advance.

An anode side interconnector 4 is formed on a surface of the mounting part 2 of fuel cell by coating and baking a corrosion resistant and conductive material to electrically connect to an adjacent fuel cell. The interconnector 4 has a net-like structure, a porous layer or a slit-like diffusion hole structure through which a liquid fuel sufficiently permeates.

An electrochemically inactive liquid fuel sucking material 5 is mounted on an inner wall surface of a fuel container 1. Fuel cells mounted on a wall surface of a fuel container are electrically connected in series or in combination of series and parallel, and fuel cell terminals 6 of an anode and a cathode are equipped to take out power from a power generation equipment.

Figure 2:
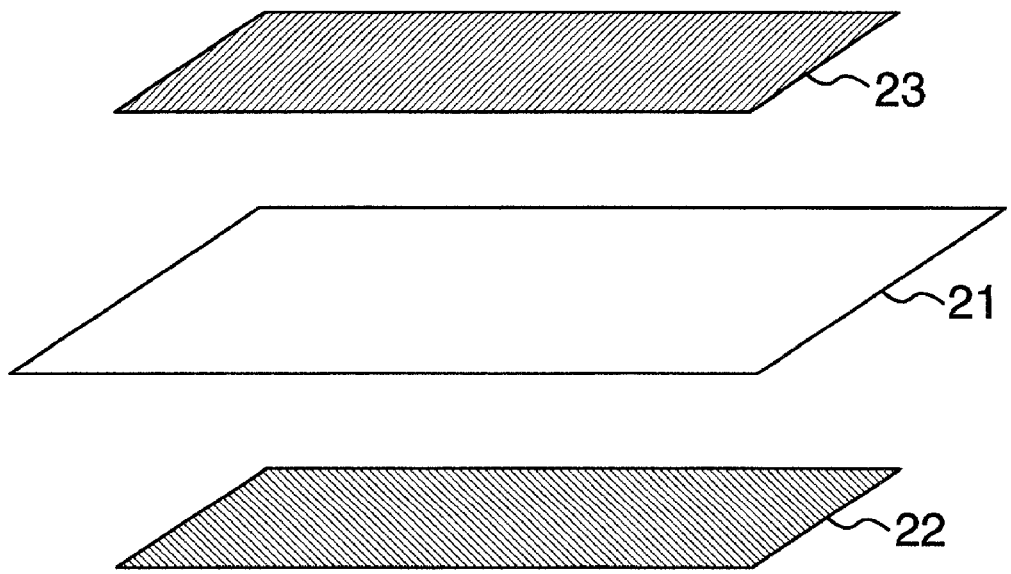
FIG. 2 is a schematic drawing showing a composition of an electrode/electrolyte membrane assembly of the present invention.
Figure 3:
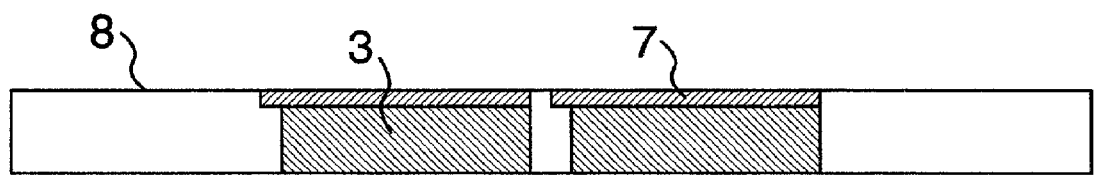
FIG. 3 is a cross-sectional drawing of a fuel cell fixing plate of the present invention.

In a unit cell, as shown in FIG. 2, an anode layer 22 and a cathode layer 23 are assembled in one piece on both surfaces of a solid electrolyte membrane 21, and an electrolyte membrane/electrode assembly (MEA) is formed in advance. A fixing plate 8 for fuel cell to fix a fuel cell to a fuel container uses an electrically insulating material as shown in FIG. 3, wherein a portion in contact with a fuel cell has a net-like structure, a porous layer or a slit-like diffusion hole structure 3 through which air sufficiently diffuses to be fed to a fuel cell, and a part of surface of the diffusion hole in contact with a fuel cell has a cathode current collector plate 7 to connect to an anode side interconnector 4 of an adjacent fuel cell.

Figure 4A:
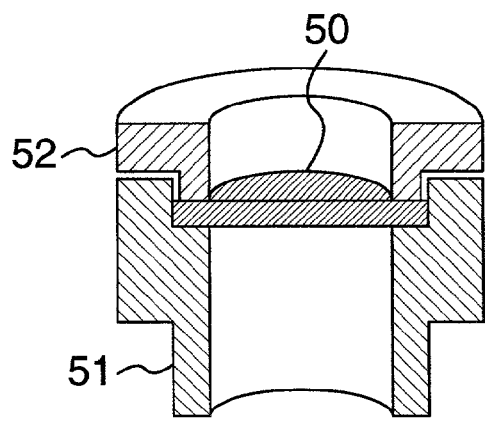
FIG. 4A and FIG. 4B are drawings of cross-sectional structures of an air vent hole and a container fitting part of the present invention.

A part of this cathode current collector plate 7 in contact with a fuel cell has a diffusion hole 3 through which air is sufficiently fed. In a fuel cell 1, carbon dioxide is formed by an oxidation of a fuel during power generation, which is discharged to outside of a fuel container through an air vent hole 15 having a gas/liquid separation function and being impermeable for liquid with a cross-sectional structure as shown in FIG. 4A.

An air vent hole 15 is composed of an air vent tube 51 and a screw-fastening type of air vent lid 52, having a structure to fix a water-repellant and porous gas/liquid separation membrane 50 with an air vent lid. The air vent holes 15 are arranged on a plurality of surfaces of a fuel container 1 so that at least one hole is in a ventilating state in any position of a fuel cell power generation equipment as the cross-sectional structure shown in FIG. 4B.

Figure 5:
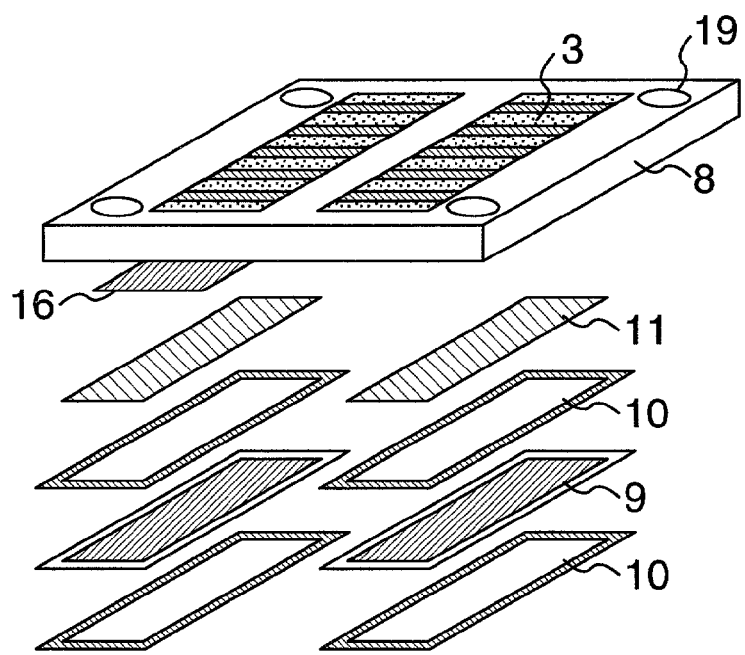
FIG. 5 is a composition drawing of a mounting part of a fuel cell of Example 1.

As shown in FIG. 5, a fuel cell power generation equipment is assembled by laminating gasket 10, MEA 9, gasket 10 and a porous diffusion layer 11, which is a woven fabric of carbon fiber finely dispersed with polytetrafluoroethylene to make diffusions of air and water formed easy, on a fuel cell mounting part of a fuel container in this order, and fixing a fuel cell fixing plate having mounting holes 19 for air vent holes to a fuel container 1 by an adhesion or a screw-fastening method. During this fixation process, a cathode current collector plate is electrically connected to an anode side interconnector of an adjacent fuel cell, and a start and an end parts are taken out as output terminals 16.

Figure 4B:
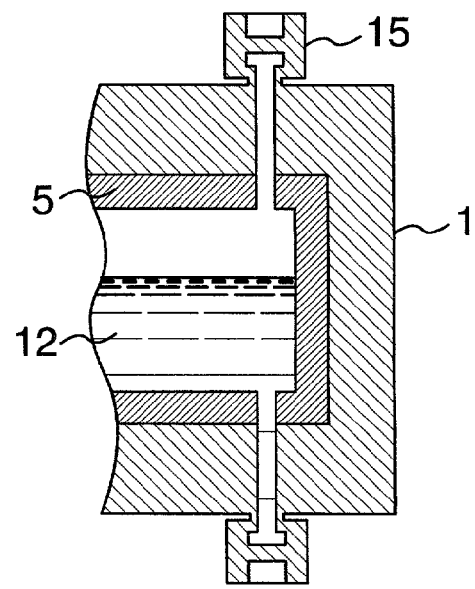

In an operation of a fuel cell power generation equipment, a lid of an air vent hole 15 shown in FIG. 4B, which also has a role of a fuel feed hole, is removed, through which a liquid fuel such as an aqueous methanol solution is filled up. Thus filled aqueous methanol solution is stably fed to an anode of a unit cell mounted on a bottom surface of the container by penetration, whereas it is also stably fed to an anode of a unit cell mounted on a upper surface by sucking up with a sucking material.

Since a cathode of each unit cell is in contact with ambient air through a net-like, a porous or a slit-like through hole, a cathode current collector plate and a cathode diffusion layer, oxygen in air is fed by diffusion and water formed during power generation are discharged by diffusion.

Figure 6:
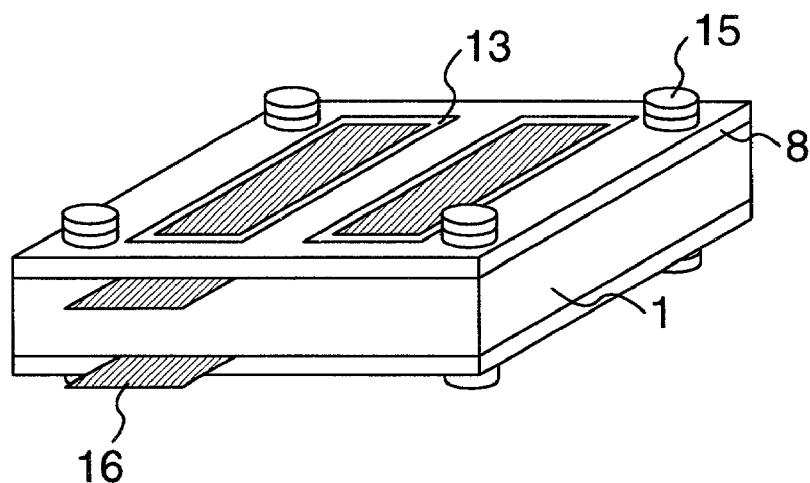
FIG. 6 is an appearance drawing of a fuel cell power generation equipment of Example 1.

FIG. 6 shows an appearance of a fuel cell power generation equipment of the present invention. The equipment has a structure in which a fuel container 1 having air vent holes 15 functions as a structural body of power generation equipment and also has a plurality of unit cells 13 fixed on its wall surface with a fuel cell fixing plate 8, and both ends, electrically connected in series, are taken out as output terminals 16.

In power generation, carbon dioxide is formed by oxidizing a fuel in an anode side, that is, in a fuel container, and discharged to outside of a fuel container through air vent holes having a gas/liquid separation function and being impermeable for liquid. These air vent holes have a feature to ensure a stable operation of power generation by arranging a plurality of holes on a wall surface of a fuel container so that at least one vent hole is kept unsealed from a liquid fuel in any position of the container during power generation.

A fuel cell power generation equipment in accordance with the present invention does not require any facility to compulsorily feed a fuel or an oxidizing agent gas, and has a structure with only one layer of unit cell mounted on a wall surface of a container without adopting a laminated structure of multiple layers of cells with a separator in between, and further dose not need a compulsory cooling mechanism due to a sufficient heat radiation. Therefore, a structure with no power loss coming from auxiliary equipment, no need of a conductive separator for lamination and reduced number of parts can be obtained.

In a fuel cell using an aqueous methanol solution as a fuel, power is generated by directly converting a chemical energy possessed by methanol to an electrical energy according to the following electrochemical reactions.

In an anode electrode side, an aqueous methanol solution fed dissociates into carbon dioxide, hydrogen ions and electrons according to the formula (1).

$$CH_3OH+H_2O \rightarrow CO_2+6H^++6e^- \qquad (1)$$

Hydrogen ions formed move from an anode to a cathode side in an electrolyte membrane, and reacts with oxygen gas coming by a diffusion from air and electrons in accordance with the formula (2) forming water on an electrode.

$$6H^++3/2O_2+6e^- \rightarrow 3H_2O \qquad (2)$$

Therefore, a total chemical reaction accompanied with power generation is an oxidation of methanol by oxygen to form carbon dioxide and water, formally the same as in a flaming combustion of methanol as shown in the formula (3).

$$CH_3OH+3/2O_2 \rightarrow CO_2+3H_2O \qquad (3)$$

An opening circuit voltage of a unit cell is about 1.2 V at around the room temperature. However, the voltage is substantially 0.85–1.0 V due to an effect of fuel penetration into an electrolyte membrane. A current density under load is selected so that the voltage in a practical operation under load becomes in the range of 0.3–0.6 V, though not specially limited. Therefore, in a practical application as a power source, a plurality of unit cells are used connected in series to provide a prescribed voltage in accordance with a requirement of load equipment.

An output current density of unit cell varies by effects of an electrode catalyst, an electrode structure and others.

However, it is designed so that a prescribed current can be obtained by effectively selecting an area of power generation part of a unit cell.

A supporting body composing a fuel cell power generation equipment in accordance with the present invention is characterized in a fuel container to receive a liquid fuel, whose cross-sectional shape may be square, circular or other any shape without any particular limitation, so long as it has a shape which can mount a necessary number of unit cells compactly. However, a cylindrical or a square shape is preferable for a compact mounting of unit cells in a specified volume, due to a good mounting efficiency and a good processability in mounting of a power generation part of fuel cell.

There is no specific limitation in a material for supporting body so long as it is electrochemically inactive in a servicing environment and has a durability, a corrosion resistance and a sufficient strength with a thin structure. A material for supporting body includes, for example, polyethylene, polypropylene, poly(ethylene terephthalate), poly(vinyl chloride), polyacrylic resins and other engineering resins, electrically insulating materials thereof reinforced with various fillers, carbon materials or stainless steels superior in corrosion resistance in a cell servicing environment, or ordinary iron, nickel, copper, aluminum or alloys thereof whose surfaces are treated to make corrosion resistant and electrically insulating. In any case, there is no limitation so long as it has strength to support a shape, corrosion resistance and electrochemical inactivity.

Inner part of a fuel cell supporting body is used as a space for fuel storage and transport. A sucking material filled in an inner part of a cylindrical supporting body to stabilize feeding of a fuel may be any type so long as it has a small contact angle with a aqueous methanol solution and is electrochemically inactive and corrosion resistant, and powdery or fibrous material is preferable. For example, fibers made of glass, alumina, silica-alumina, silica, non-graphite carbon and cellulose or water absorptive polymer fibers are materials with a low packing density and a superior retention for an aqueous methanol solution.

As an anode catalyst which composes a power generation part, fine particles of platinum and ruthenium or platinum/ruthenium alloys dispersed and supported on carbon powder, whereas, as a cathode catalyst, fine particles of platinum dispersed and supported on carbon carrier are materials to be easily manufactured.

An anode and a cathode catalysts in a fuel cell of the present invention are not specially limited so long as they are used in a usual direct methanol fuel cell, and it is preferable to use a catalyst of the above described noble metal components added with a third component selected from iron, tin, rare earth elements and the like, to stabilize or extend a life of electrode catalyst.

As an electrolyte membrane, a hydrogen ion conductive membrane is used although not limited. Typical material includes sulfonated or alkylenesulfonated fluoropolymers such as perfluorocarbon type sulfonic acid resin, poly(perfluorostyrene) type sulfonic acid resin, polystyrenes; polysulfones; polyethersulfones; polyetherethersulfones; polyetheretherketones; and other sulfonated hydrocarbon polymers.

Materials with a small methanol permeation among these electrolyte membranes are preferable because they can raise a coefficient of utilization of fuel with little lowering of cell voltage by fuel crossover, and generally enable to operate a fuel cell at the temperature not higher than 90° C. Fuel cell which can be operated at further higher temperature range can also be obtained by using a composite electrolyte membrane prepared by a heat resistant resin micro-dispersed with a hydrogen ion conductive inorganic material such as hydrates of tungsten oxide, zirconium oxide and tin oxide; tungstosilicic acid; molybdosilicic acid; tungstophosphoric acid and molybdophosphoric acid.

In any of these cases, higher levels of miniaturization and longer power generation time, which are the effects of the present invention, are attained by using an electrolyte membrane having a high hydrogen ion conductivity and a low methanol permeability, due to a higher coefficient of utilization of fuel.

The above described hydrated type of acidic electrolyte membranes may, in general, have problems such as a membrane deformation induced by a difference in swelling between dry and wet conditions and an insufficient mechanical strength with a membrane having a sufficiently high ion conductivity. In these cases, it is effective methods for enhancing a reliability of cell performance to use a fiber with superior mechanical strength, durability and heat resistance as a core material in a form of non-woven fabric or woven fabric or to add these fibers as reinforcing fillers in manufacturing an electrolyte membrane.

In addition, a membrane of polybenzimidazoles doped with sulfuric acid, phosphoric acid, sulfonic acids or phosphonic acids may also be used to reduce a fuel permeability of an electrolyte membrane.

As another example instead of the above described method, a power generation part of unit cell can be prepared, for example, by the following processes. That is, a unit cell is prepared through the following processes:

(i) A process to coat a conductive interconnector on an electrically insulating outer circumferential surface of a liquid fuel container and make a wall surface of an anode junction part porous by through holes;

(ii) A process to prepare a past by adding and dispersing a solution which is prepared by dissolving an anode catalyst and an electrolyte resin in a volatile organic solvent in advance, then form an electrode by coating the past on a notched porous part of a liquid fuel container in a certain thickness of 10–50 μm;

(iii) A process to mask the coated anode part, coat a gasket for sealing on the notched part, then join to a fuel container.

(iv) A process subsequently to coat an electrolyte solution, prepared by dissolving in a volatile organic solvent in advance, on the notched part in contact with an anode electrode so that a thickness after forming a membrane becomes 20–50 μm;

(v) A process then to prepare a past as a binder by mixing a solution which is prepared by dissolving a cathode catalyst and an electrolyte resin in a volatile organic solvent in advance, and form an electrode by coating the past on an electrolyte membrane in a certain thickness of 10–50 μm;

(vi) A process further to prepare a past by mixing carbon powder and a prescribed amount of water repellent dispersing agent, for example, aqueous dispersion of fine particles of polytetrafluoroethylene, and form a diffusion layer by coating the past on the notched part in contact with a surface of cathode electrode in an outside of the electrode.

In the process (iv) among these processes, it is important to seal the electrolyte membrane part by closely contacting or adhering using an adhesive with the gasket by making an electrolyte membrane part larger than a cathode area.

A cathode current collector is prepared by mounting a conductive porous material or a net in a cathode side diffusion layer part of thus obtained unit cell, which is electrically connected to an interconnector from an adjacent unit cell, and terminals are taken out from both ends connected in series. It is an effective method for preventing flooding of water formed during a fuel cell operation, to provide a diffusion layer in a cathode side.

In addition, in manufacturing a diffusion layer, in a case when a water repellent aqueous dispersing agent contains a surfactant which is a poisonous component for platinum catalyst or platinum/ruthenium alloy catalyst, it is an effective method to coat a past prepared by mixing carbon powder and a certain amount of water repellent dispersing agent, for example, aqueous dispersion of fine particles of polytetrafluoroethylene on one side of a conductive woven fabric such as a carbon fiber, then mount the fabric so that the coated side is in contact with a cathode after burning at a decomposition temperature of the surfactant in advance, and use the woven fabric of carbon fiber as a cathode current collector.

In any case, there is no special limitation in a manufacturing method so long as a unit cell is manufactured by providing an anode, an electrolyte membrane, a cathode and a diffusion layer in layers in this order, and forming sufficient reaction interfaces between anode/electrolyte membrane and cathode/electrolyte membrane.

Further, a cell composition without requiring a diffusion layer may be prepared by coating a past prepared by adding a prescribed amount of a water repellent dispersing agent, for example, fine particles of polytetrafluoroethylene to a solution prepared by dissolving cathode catalyst, electrolyte membrane and electrolyte in a volatile organic solvent in advance in forming a cathode.

A high voltage intended by the present invention can be attained by using a liquid fuel container as a platform, preparing multiple unit cells composed of an anode, an electrolyte membrane and a cathode on its outer circumferential surface, and connecting each unit cell in series with a conductive interconnector. In addition, a compact power source can also be attained, which can be operated without using auxiliary equipment to compulsorily feed a fuel and an oxidizing agent or without using auxiliary equipment to compulsorily cool a fuel cell, and provide a long time continuous power generation by using a aqueous methanol solution having a high volume energy density as a liquid fuel.

This compact power source can be used as a built-in driving unit for a cellular phone, notebook-type personal computer or a mobile video camera, and can be continuously used for a long time by sequentially feeding a fuel prepared in advance.

Further, it is also effective to use this compact power source as a battery charger, by connecting it with a charger of, for example, a secondary battery driven cellular phone, notebook-type personal computer or mobile video camera, and by mounting it in a part of container case thereof, to remarkably reduce a frequency of fuel feeding compared with the above described case. In this case, the portable electronic device is driven with a secondary battery by removing the fuel cell power generation equipment from a container case when in service, whereas when not in service, the fuel cell power generation equipment is put in the case and the compact fuel cell power generation equipment built in the case is connected via a charger to charge the secondary. Thus, volume of a fuel tank can be enlarged and a frequency of fuel feeding can be remarkably reduced.

DESCRIPTION OF PREFERRED EMBODIMENTS

The present invention will be described based on the Examples hereinbelow.

COMPARATIVE EXAMPLE 1

Figure 7A:
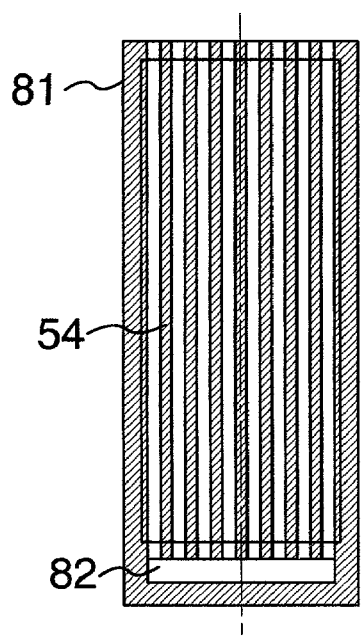
FIG. 7A and FIG. 7B are appearance and cross-sectional drawings of a separator of Comparative Example 1.
Figure 7B:
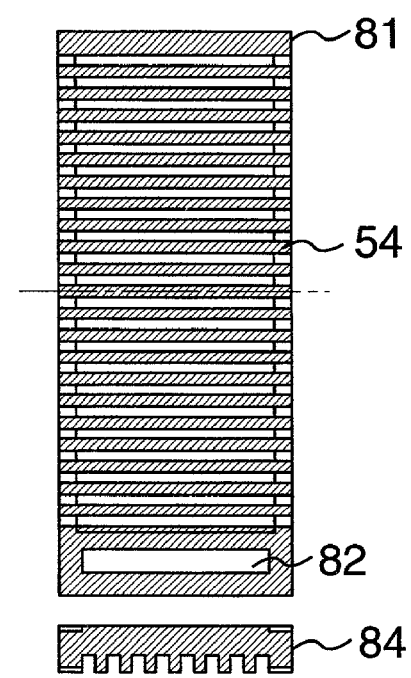
Figure 8:
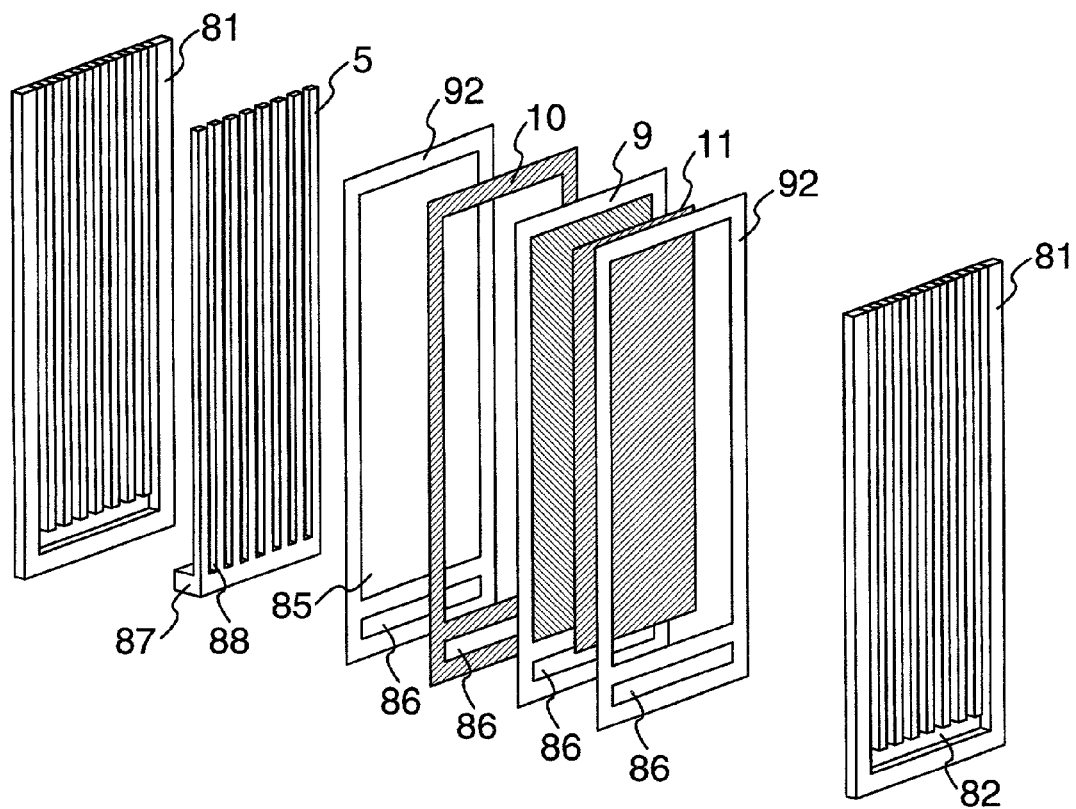
FIG. 8 is a composition drawing of a laminated composition of a fuel cell of Comparative Example 1.
Figure 9:
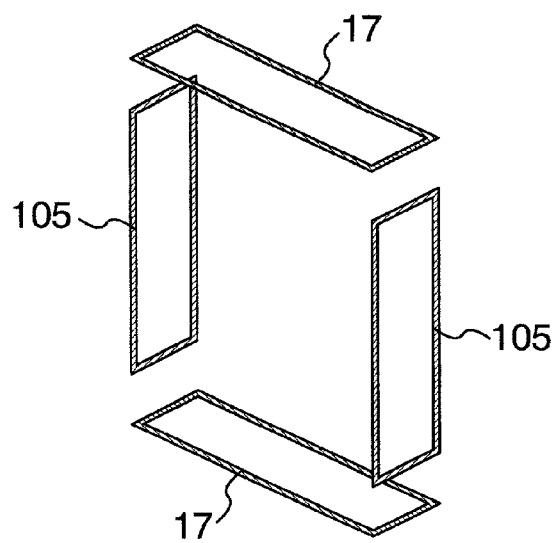
FIG. 9 is a composition drawing of an outer plate of a high voltage type rectangular tube shaped unit cell of the present invention.
Figure 10A:
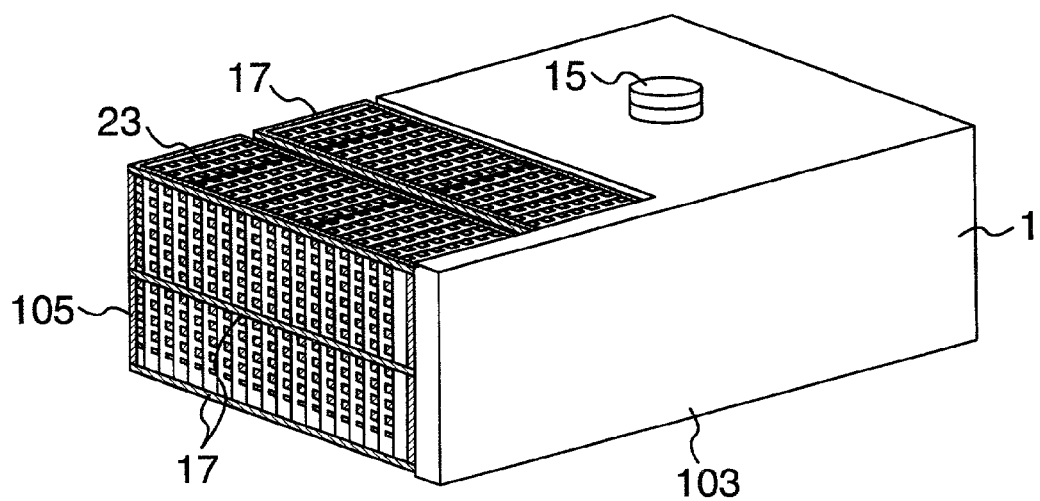
FIG. 10A and FIG. 10B are drawings showing an appearance structure of a power source and a connection of power source/fuel tank of Comparative Example 1.
Figure 10B:
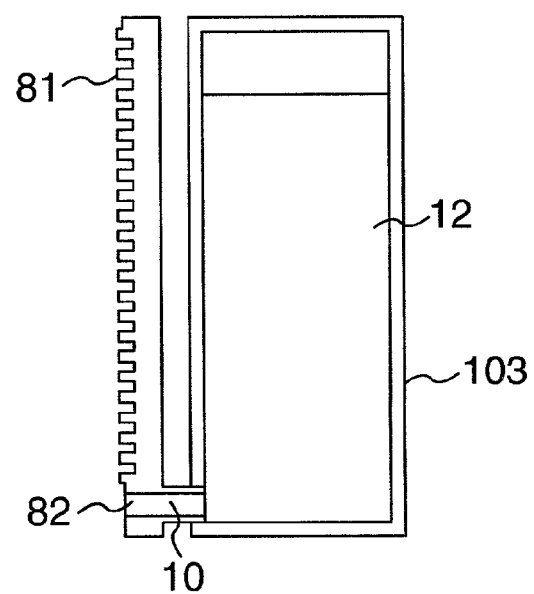

FIG. 7 is a cross-sectional drawing showing a separator structure based on a conventional structure. FIG. 7A shows an in-plane structure and a longitudinal cross-sectional drawing of one part and FIG. 7B shows an in-plane structure and a lateral cross-sectional drawing of the other part, FIG. 8 and FIG. 9 show a laminated composition of cell and a composition of cell holder, respectively, FIG. 10A shows a structure of power source system composed of 2 sets of laminated unit cells 18 in series and a fuel container attached, and FIG. 10B shows a cross-sectional structure of connection between a fuel cell at a lamination end and a fuel container.

A graphitized carbon plate of 16 mm width×33 mm length×2.5 mm thickness was used for a separator 81. An inner manifold 82 of 10 mm width×4 mm length is mounted at a bottom of the separator 81, and a fuel feeding channel was provided to connect a manifold 82 and upper surface of a separator 81 by forming a rib part 54 by making channels of 1 mm width×0.8 mm depth×23 mm length at 1 mm interval as shown by numeral 84 in FIG. 7B of a lateral cross-sectional drawing of a separator.

On the other hand, in other surface of the separator, a feeding channel for an oxidizing agent to connect a side surface of a separator 21 was made by forming a rib part 84 composed of channels of 1 mm width×1.4 mm depth×16 mm length at 1 mm interval in rectangular direction to the opposite surface, as shown in FIG. 7B and a longitudinal cross-sectional drawing 83 of a separator.

As an anode layer, a porous membrane of about 20 μm thickness was formed on a polyimide film by screen printing of a slurry, prepared by mixing catalyst powder of 50% by weight of fine particles of platinum/ruthenium alloy, in an atomic ratio of platinum/ruthenium being 1/1, dispersed and supported on carbon carrier, 30% by weight of perfluorocarbon sulfonic acid electrolyte (trade name: Nafion 117 from DuPont Inc.) as a binder, and water/alcohol mixed solvent (water:isopropanol:n-propanol is 20:40:40, ratio by weight).

As a cathode layer, a porous membrane of about 25 μm thickness was formed on polyimide film by screen printing of a slurry, prepared by mixing 30% by weight of fine powder catalyst of platinum supported on carbon carrier and an electrolyte in a water/alcohol mixed solvent as a binder.

Thus prepared anode and cathode porous membranes were cut out each in 10 mm width×20 mm length to obtain an anode and a cathode layers.

Next, manifold opening part 86 was made in Nafion 117 with 16 mm width×33 mm length×50 μm thickness, as an electrolyte membrane.

An anode layer surface was joined to a power generation part of the above electrolyte membrane, after being penetrated with about 0.5 ml of a 5% by weight aqueous alcohol solution of Nafion 117 (a mixed solvent of water:isopropanol:n-propanol is 20:40:40, ratio by weight, from Fluka Chemika Ltd.), followed by drying at 80° C. for 3 hours under about 1 kg of load. Then, a cathode layer surface was joined to the electrolyte membrane so that the electrolyte membrane was overlapped with the above joined anode layer, after being penetrated with about 0.5 ml of a 5% by weight of the above described aqueous alcohol solution of Nafion 117, followed by drying at 80° C. for 3 hours under about 1 kg of load to prepare MEA 9.

Next, a poly(ethylene terephthalate) liner 92 with 250 μm thickness and a neoprene gasket 10 with 400 μm thickness were prepared by making manifold opening part 86 and power generation opening part 85 of the same size as in the separator 81.

Then, a carbon sheet was formed by adding an aqueous dispersion of water repellent fine particles of polytetrafluoroethylene (Teflon dispersion D-1 from Daikin Industries Ltd.) to carbon powder so that a concentration of the water repellant became 40% by weight after firing, and mixing to a paste, coating the paste on one surface of a carbon fiber woven fabric having about 350 μm thickness and a porosity of 87% in a thickness of about 20 μm, drying at room temperature and firing at 270° C. for 3 hours. Thus obtained sheet was cut out to the same size and shape as of the above described MEA electrode to prepare a diffusion layer 11.

Then, a fuel sucking material 5 made of pulp paper, consisting of a channel insertion part 88 in a fuel electrode side of separator 81 and a manifold insertion part 87, was prepared.

These parts were laminated, as shown in FIG. 8, in the order of a separator 81, a sucking material 5, a liner 92, a gasket 10, MEA 9, a diffusion layer 11, a liner 92 and a separator 81 as one unit, and 14 units were piled up, followed by pressing at about 5 kg/cm$^2$ to obtain a laminated cell 94. Said laminated cell 94 was fixed as shown in FIG. 10A, with a fastening band 17 made of fluorocarbon rubber (Viton from DuPont Inc.), using a SUS 316 holder 105, having a structure shown in FIG. 9, whose surface was insulated with an epoxy resin (Flep from Toray Thiokol Co., Ltd.).

A fuel container 1 was prepared with polypropylene having outer dimensions of 33 mm height×85 mm length×65 mm width×2 mm side wall thickness and having a laminated cell mounting part 103.

As shown in FIG. 10B, in a center part of fuel container 1, an air vent tube 51 with a screw lid 52 having a gas permselective function which mounted a porous polytetrafluoroethylene membrane, having a structure similar to that shown in FIG. 4A as a gas/liquid separation membrane 50, was provided as an air vent hole 15, and inside of the fuel container is filled with an aqueous methanol solution 12 as a fuel. Thus prepared two laminated cells having a structure as shown in FIG. 10B were connected to a fuel cell mounting part 103 to obtain a power source having a structure as shown in FIG. 10A.

The above power source has a size of about 33 mm height×120 mm length×65 mm width, and is equipped with a fuel container having a surface area of power generation part of about 2 cm$^2$ and a volume of about 150 ml. The power source showed a voltage of 5.7 V at the operation temperature of 50° C. and the load current of 0.2 A, and also showed a voltage of 11.8 V when operated with blasting with a fan to whole surface of openings in a side wall of power source composed of side channels in an air electrode side of separator. This is considered to happen because oxygen is not fed sufficiently by air diffusion using a side channel structure with air electrode of a separator when a power source is loaded. A volume output density of this power source was about 4.4 W/l without using an air vent fan and about 9.2 W/l using the air vent fan.

When a fuel container was filled with 150 ml of a 10% by weight of aqueous methanol solution, and the power source was operated at the operation temperature of 50° C. and the load current of 0.2 A with a blasting fun, an output voltage continued to show 11.8 V for about 4.5 hours, then rapidly dropped. Therefore, a volume energy density in an operation when the fuel of a 10% by weight of aqueous methanol solution was filled was 41 Wh/l using an air vent fan.

This fuel cell power generation equipment has a structure in which a liquid fuel is sucked up from a manifold in the bottom of laminated cell and carbon dioxide formed by an oxidation of a fuel is discharged from the top of laminated cell. Therefore, it has a problem that power generation can no longer be continued when it is placed upside down or turns sideways during operation.

EXAMPLE 1

Figure 11:
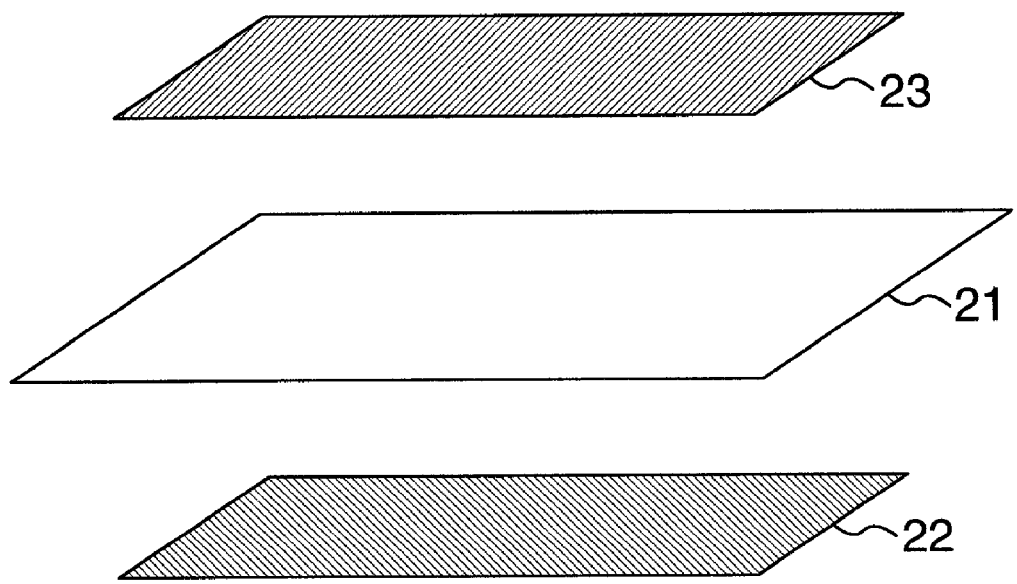
FIG. 11 is a composition drawing of electrode/electrolyte membrane assembly of Example 1.

FIG. 11 shows a structure of MEA in accordance with this Example. MEA is formed by joining an anode layer 22 and a cathode layer 23 using an electrolyte resin as a binder so that they are overlapped with both sides of an electrolyte membrane 21.

As an anode layer, a porous membrane of about 20 μm thickness was formed by screen printing of a slurry, prepared by 50% by weight of fine powder catalyst of platinum/ruthenium alloy with an atomic ratio of platinum/ruthenium being 1/1, dispersed and supported on carbon carrier, and 30% by weight of perfluorocarbone sulfonic acid electrolyte (Nafion 117) in a water/alcohol mixed solvent (water:isopropanol:n-propanol is 20:40:40 ratio by weight) as a binder.

As a cathode layer, a porous membrane of about 25 μm thickness was formed by screen printing of a slurry, prepared by 30% by weight of fine powder catalyst of platinum supported on carbon carrier and an electrolyte in a water/alcohol mixed solvent as a binder.

The above-mentioned anode and cathode porous membranes were cut out each in 10 mm width×20 mm length to obtain an anode layer 22 and a cathode layer 23. Nafion 117 electrolyte membrane with the thickness of 50 μm was cut out in 20 mm width×30 mm length and a surface of the anode layer was joined to a center part of the electrolyte membrane, after being penetrated with about 0.5 ml of a 5% by weight aqueous alcohol solution of Nafion 117 (a mixed solvent of water: isopropanol:n-propanol is 20:40:40 ratio by weight, from Fluka Chemika Ltd.), followed by drying at 80° C. for 3 hours under the load of about 1 kg.

Then, a surface of cathode layer was joined to a center part of the electrolyte membrane so that the layer was overlapped with an anode layer 22 joined in advance, after being penetrated with about 0.5 ml of a 5% by weight aqueous alcohol solution of Nafion 117 (from Fluka Chemika Ltd.), followed by drying at 80° C. for 3 hours under the load of about 1 kg to prepare MEA.

Subsequently, a carbon sheet was prepared by adding an aqueous dispersion of water repellent fine particles of polytetrafluoroethylene (Teflon dispersion D-1 from Daikin Industries Ltd.) so that a concentration of the repellant became 40% by weight after firing to carbon powder and mixing to a paste, coating the paste on one surface of a carbon fiber woven fabric having the thickness of about 350 μm and the porosity of 87%, to the thickness of about 20 μm, drying at room temperature and firing at 270° C. for 3 hours. Thus obtained sheet was cut out to the same size and shape as of the above described MEA electrode to prepare a diffusion layer.

Figure 13:
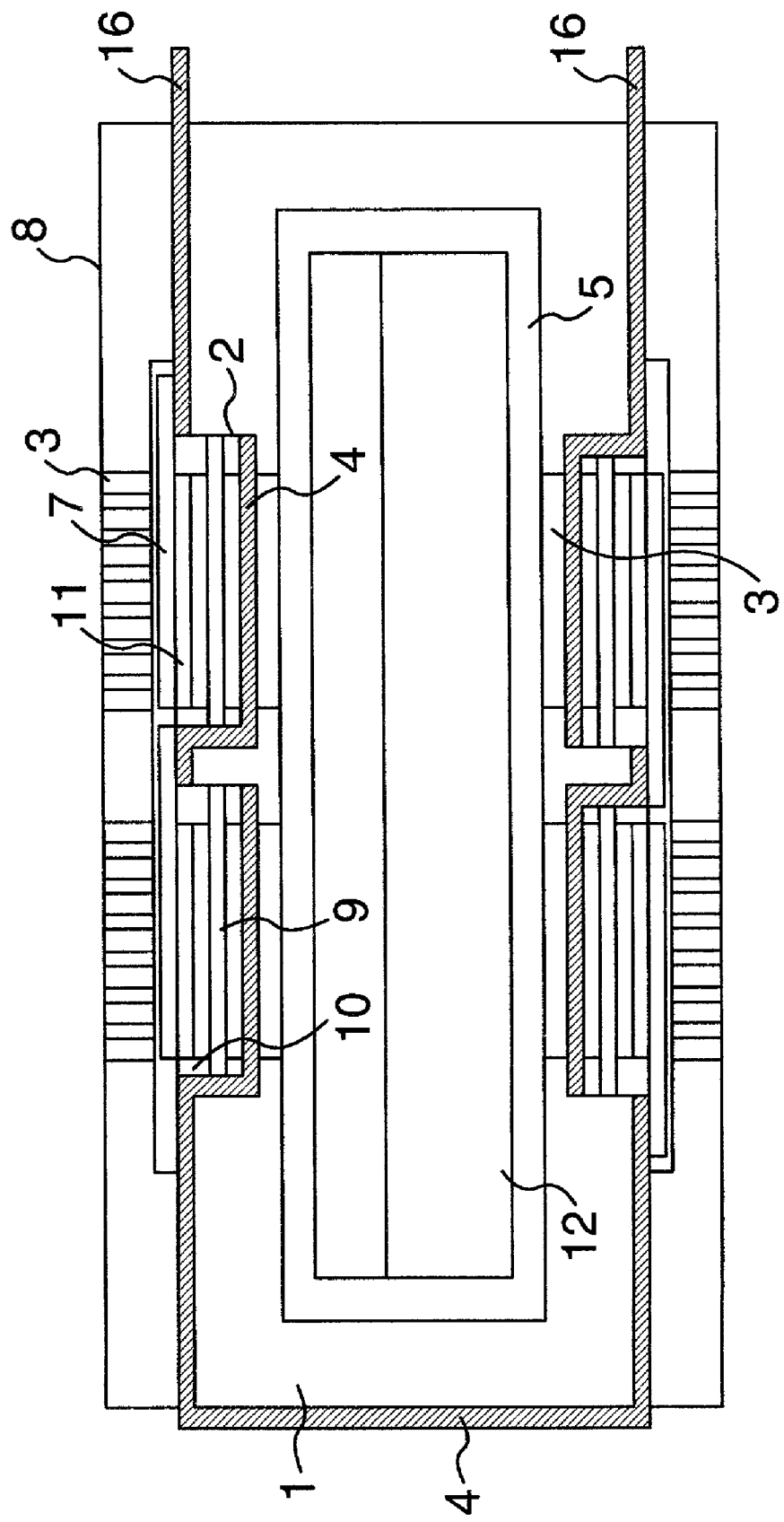
FIG. 13 is a cross-sectional drawing of a fuel cell power generation equipment of Example 1.

Next, a method for mounting a fuel cell composed of MEA on an outer circumferential surface of fuel container will be explained using FIG. 13 showing a cross-sectional structure of a fuel cell power generation equipment.

A fuel sucking material 5 made of a glass fiber mat with the thickness of 5 mm and the porosity of about 85% was mounted on an inner wall surface of a fuel container 1, made of rigid poly(vinyl chloride) having the outer dimensions of 65 mm width×135 mm length×25 mm height and the wall thickness of 2 mm.

Eighteen fuel cell mounting parts 2, having the dimensions of 21 mm width×31 mm length×0.5 mm depth, were equipped in each of a top and a bottom of outer wall surface of a fuel container 1. A diffusion hole 3 was made by preparing slits of 1 mm width×10 mm length in an interval of 1 mm in each fuel cell mounting part 2 in contact with an anode. In these slits, a carbon fiber mat with the porosity of 85% was filled so as to contact with a fuel sucking material 5 mounted at inner wall surface of a fuel container.

In an outer surface of the slit, an electroless nickel plated layer with the thickness of about 50 µm was provided as an interconnecter 4 to electrically connect to a cathode current collector 7 of an adjacent fuel cell. Air vent holes 15, having a gas/liquid separation function with the same structure as shown in FIG. 4A, were provided at four corners of a top and a bottom of the fuel container thus obtained.

Then, a fuel cell fixing plate 8 is made using rigid poly(vinyl chloride) with the thickness of 2.0 mm, the same as a fuel container 1, and a slit of 1.0 mm width×20 mm length was provided on its surface in contact with a cathode of each fuel cell in a rectangular direction to the slit provided in a fuel cell mounting part 2 as a diffusion hole 3. On this fuel cell fixing plate 8, a cathode current collector 7 made of nickel with a slit, which was formed in the same shape as its slit part so as to connect to an interconnector 4 of an adjacent fuel cell, was fixed.

Figure 12:
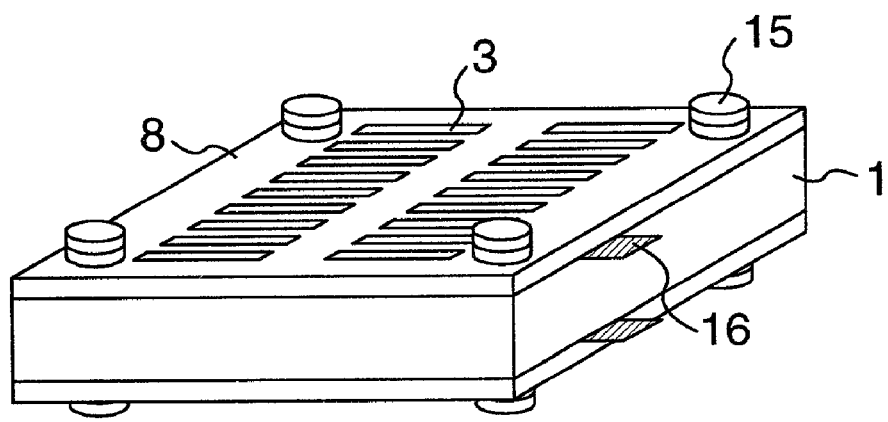
FIG. 12 is an appearance drawing of a fuel cell power generation equipment of Example 1.

In mounting the above described MEA 9 on this fuel container, each cell was fixed to a fuel container with a fuel cell fixing plate 8, after arranging MEA 9, having seal gaskets 10 on both surfaces, in a fuel cell mounting part 2, and a diffusion layer 11 in its cathode side. In this fixation process, a cathode current collector 7, which was arranged in advance in a cathode side surface of the fuel cell fixing plate 8, electrically connects a cathode and an interconnector 4 from an anode of adjacent fuel cell, and connects each cell in series. End parts, connecting each fuel cell, are taken out as cell terminals 16 from an interface of the fuel cell fixing plate 8 and the fuel container to an outside of the container. FIG. 12 shows an appearance of a fuel cell power generation equipment in accordance with this Example.

On an upper and a bottom surfaces of fuel container 1 having air vent holes 15, 36 unit cells 13 are mounted by the fuel cell fixing plate 8, and an output terminal 16 is provided. A 10% by weight of aqueous methanol solution 12 is charged into the container through one of the air vent holes 15 of the fuel container thus mounted with fuel cells. This fuel cell has the dimensions of about 65 mm width×135 mm length×29 mm height and the fuel containing volume of about 150 ml. A power generation equipment has the power generation surface area of 2 $cm^2$ and is composed of 36 series.

An output voltage of this fuel cell power generation equipment in operation was 12.2 V at the temperature of 50° C. and the load current of 200 mA. A continuous power generation was possible for about 4.5 hours in the operation by filling a 10% by weight of aqueous methanol solution and at the load current of 200 mA. An output density of this fuel cell power generation equipment was about 9.6 W/l and a volume energy density per litter fuel was about 50 Wh/l.

In addition, no change in an output voltage or no pressure rise in a fuel container was observed even if the power generation equipment was operated in the positions of upside down or turning sideways.

As described above, a high voltage type compact fuel cell of 12 volt class can be attained without laminating with a separator in between by mounting multiple fuel cells on an outer wall surface of a liquid fuel container and connecting in series by an interconnector. In this case, a power source without requiring auxiliary equipment such as a fuel feed pump and a fan for cathode gas became possible by contacting an anode and an inner part of container using a liquid fuel sucking material in the anode side and exposing a cathode to ambient air through a diffusion layer.

In particular, by arranging air vent holes having a gas/liquid separation function on a plurality of surfaces of a fuel container, a normal power generation became possible at any position of a fuel cell, and essential characteristics for a portable power generation equipment could be attained.

COMPARATIVE EXAMPLE 2

A compact fuel cell of low voltage type using a separator will be explained using FIG. 14. Using the same materials and sizes as in Comparative Example 1 for separator, sucking material, liner, gasket, MEA and diffusion layer as components of a cell, a laminated cell 23 was prepared by the same procedure as in Comparative Example 1 so as to have four unit cells. This laminated cell was inserted to a cell holder 105, and fastened with a fastening band 17 made of fluorocarbon rubber in the same manner as in Comparative Example 1.

A fuel cell was made of polypropylene with the outer dimensions of 33 mm height×16 mm length×65 mm width and the wall thickness of 2 mm.

Figure 14:
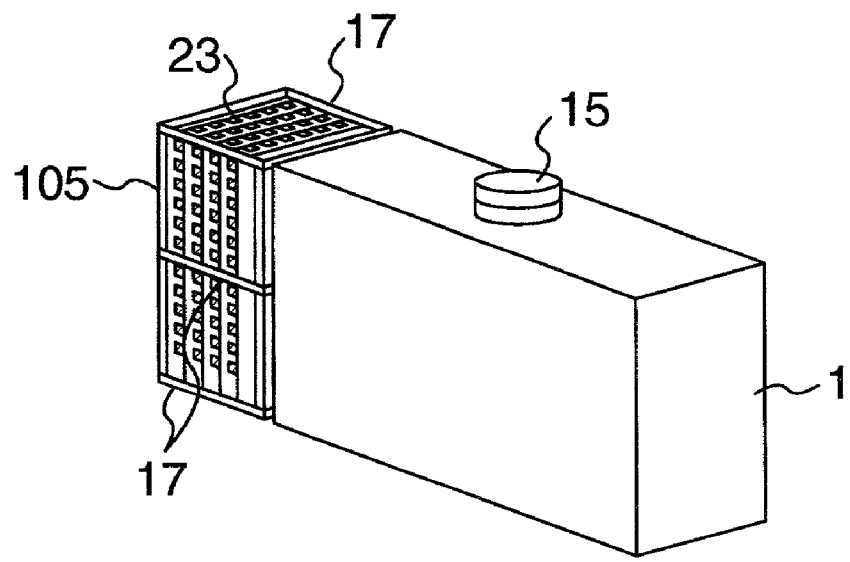
FIG. 14 is an appearance drawing of a fuel cell power generation equipment of Comparative Example 2.

As shown in FIG. 14, air vent holes 15 mounted with porous polytetrafluoroethylene membranes having the same structure as shown in FIG. 4A were provided at the central part of an upper surface of a fuel container 1.

A power source was prepared using thus prepared laminated cell 23 combined with a fuel container 1 with the same composition as in Comparative Example 1. Thus obtained power source has the dimensions of about 33 mm height×82 mm length×16 mm width, with the surface area of power generation part of about 2 $cm^2$ and a fuel container 1 having the volume of about 20 ml.

The power source shows 0.58 V at the operation temperature of 50° C. and the current load of 0.2 A, and 1.26 V when operated by blasting with a fan to the whole area of opening part in a side wall of the power source composed of side channels in an air electrode side of a separator. It is considered to happen because oxygen was not fed by air diffusion with the air electrode side channel structure of a separator under a loaded power source. A volume output density of this power source was about 2.7 W/l when an air vent fan was not used and about 5.8 W/l when the air vent fan was used.

An output voltage was 1.26 V in the operation by filling 20 ml of a 10% by weight of aqueous methanol solution, using a blast fan at the operation temperature of 50° C. and the load current of 0.2 A. The voltage continued for about 5 hours, then rapidly dropped. Therefore, a volume energy density per litter fuel of a 10% by weight of aqueous methanol solution was 29 Wh/l when a blast fan was used.

This fuel cell power generation equipment has a structure in which a liquid fuel is sucked up from a manifold in the bottom of laminated cell and carbon dioxide formed by an oxidation of a fuel is discharged from the top of laminated cell. Therefore, it has a problem that power generation can no longer be continued when it is placed upside down or turns sideways during operation.

EXAMPLE 2

Figure 15:
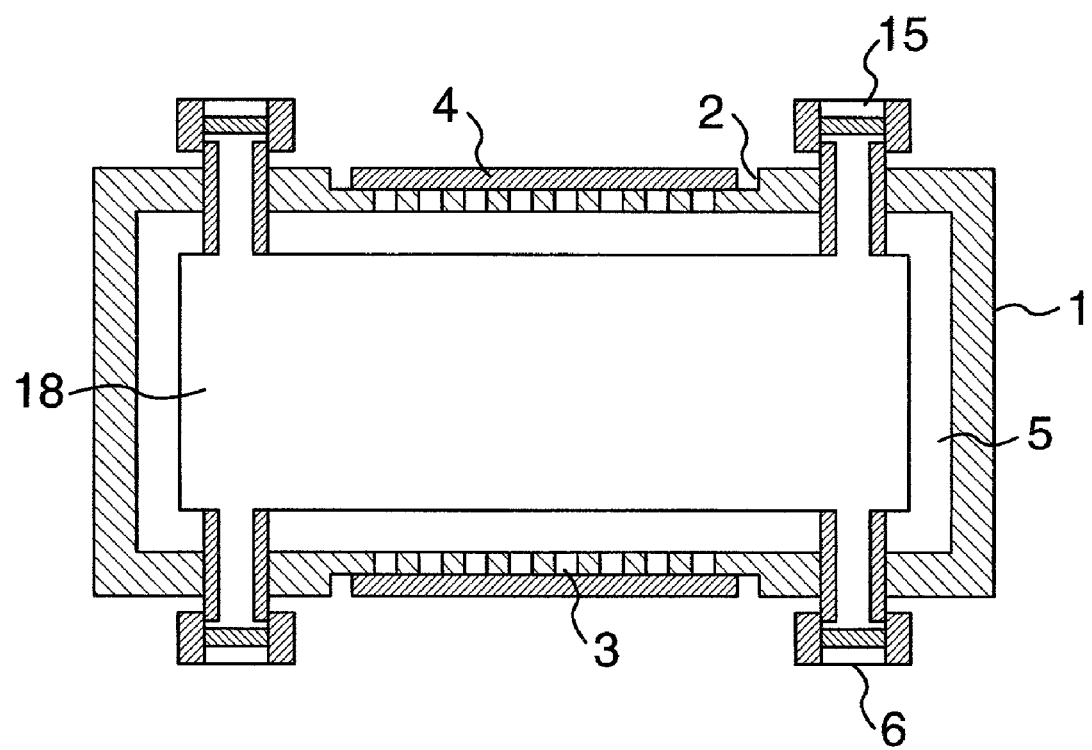
FIG. 15 is a cross-sectional drawing of a fuel container of Example 2.
Figure 16:
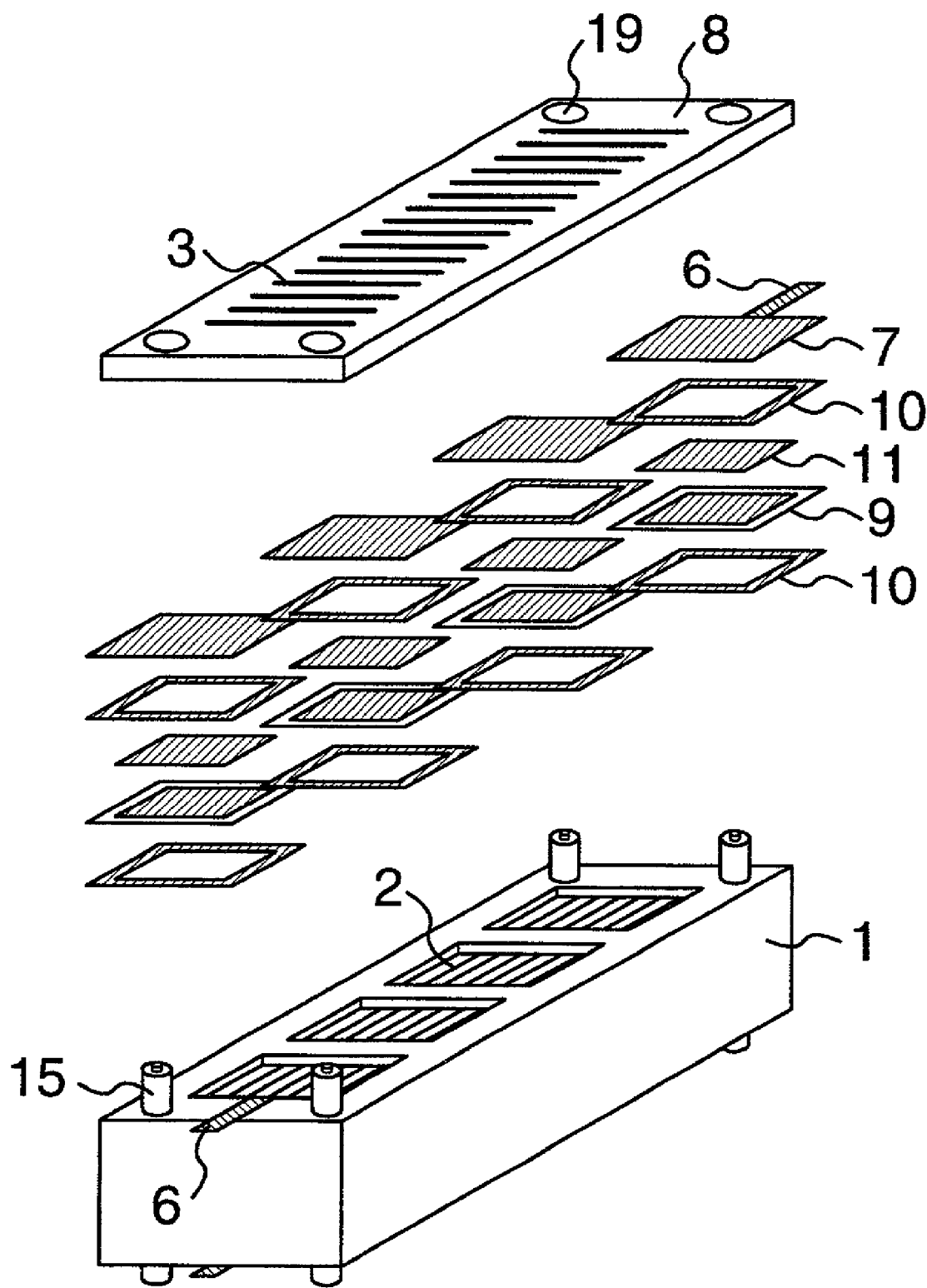
FIG. 16 is a composition drawing of mounting part of a fuel cell of Example 2.

FIG. 15 shows a cross-sectional structure of a rectangular type and low voltage type of power generation equipment using methanol as a fuel in accordance with this Example, and FIG. 16 shows outline of a mounting method for fuel cells. MEA was prepared by an almost similar method as in Example 1. A porous membrane of about 20 μm thickness was formed on a polyimide film with the dimensions of 30 mm width×50 mm length by screen printing using a slurry, which was prepared by mixing a catalyst powder of 50% by weight of platinum/ruthenium alloy fine particles, an atomic ratio of platinum/ruthenium being 1/1, dispersed and supported on carbon carrier, 30% by weight of perfluorocarbon sulfonic acid electrolyte (Nafion 117) as a binder and a water/alcohol mixed solvent (water:isopropanol:n-propanol was 20:40:40, ratio by weight), followed by drying at 90° C. for 3 hours to get an anode porous layer.

A porous cathode layer of about 25 μm thickness was formed on a polyimide film with the dimensions of 30 mm width×50 mm length by screen printing of a slurry, which was prepared by mixing a catalyst powder of 30% by weight of fine platinum powder supported on carbon carrier, an electrolyte as a binder and a water/alcohol mixed solvent, followed by drying at 90° C. for 3 hours.

Thus prepared anode and cathode porous membranes were cut out each in 10×10 mm size to obtain an anode layer and a cathode layer. Sulfonated polyetherethersulfone membrane of 28 mm width×56 mm length×50 μm thickness having 790 g/eq was used as an electrolyte.

Firstly, eight anode layers were penetrated with about 0.5 ml of a 5% by weight aqueous alcohol solution of Nafion 117 (from Fluka Chemika Ltd.) in each surface, then arranged evenly on one surface of an electrolyte membrane, followed by drying of each electrode at 80° C. for 3 hours under the load of about 1 kg.

Then, a cathode layer surface was penetrated with about 0.5 ml of a 5% by weight aqueous alcohol solution of Nafion 117, then arranged on the opposite side surface of the above electrolyte membrane joined with an anode so as to be overlapped with the anode layer, followed by drying at 80° C. for 3 hours under the load of about 1 kg on each cell to prepare MEA.

As shown in FIG. 16, a fuel container 1 was made of rigid poly(vinyl chloride), having the outer dimensions of 22 mm width×79 mm length×23 mm height and wall thickness of 2 mm. As shown in FIG. 15 of a cross-sectional structure, four fuel cell mounting parts 2, having the dimensions of 16 mm width×16 mm length×0.5 mm depth, were provided on each of an upper and a bottom surfaces of the fuel container 1. A slit of 1 mm width×10 mm length through an inside of the fuel container 1 was provided as a diffusion hole 3, in the central part of fuel cell mounting parts 2 with the size of 10 mm width×10 mm length.

In an outer surface of this mounting parts 2, a nickel layer with the thickness of about 0.1 mm was formed by an electroless plating method as an interconnector 4 in order to electrically connect to an adjacent fuel cell. A fuel sucking material 5 was provided by adhering a glass fiber mat with the thickness of 1 mm thickness and the porosity of about 70% on an inner wall of the fuel container 1, and further a low density fuel retaining layer 18 filled with a glass fiber was provided in the container so as to make a porosity about 85%. Eight air vent holes 15, with a structure as shown in FIG. 4A and an inner diameter of 2 mm, were provided at corners of an upper and a bottom surfaces of the fuel container 1.

As shown in FIG. 16, a fuel cell fixing plate 8 as a holding plate for a fuel cell was prepared using rigid poly(vinyl chloride) with the dimensions of 22 mm width×79 mm length×1 mm thickness, and a slit of 1 mm width×10 mm length was provided in its surface in contact with a cathode of each fuel cell in a rectangular direction to the slit of a fuel cell mounting part 2 of fuel container 1, and also air vent hole mounting holes 19 were provided at the four corners.

A cathode current collector 7 made of nickel with the thickness of 0.2 mm having a slit was mounted on a fuel cell fixing plate 8 to connect to an interconnector in an anode side of an adjacent fuel cell.

The fuel cell of this Example was prepared by laminating an anode side gasket made of neoprene rubber, MEA 9, a cathode side diffusion plate 11, a cathode side gasket 10 made of neoprene rubber and a fuel cell fixing plate 8 in this order as shown in FIG. 16, and said fixing plate was fixed to a fuel container 1 by screwing its peripheral part.

Output terminals 16 were made by connecting an anode side terminal 6 and a cathode side terminal 6 mounted in an upper and a bottom sides of the fuel container 1 each in parallel. Thus obtained fuel cell power generation equipment has the outer dimension of 22 mm width×79 mm length×27 mm height and the power generation area of 1 cm$^2$, and composed of four series×two parallel fuel cells.

A volume of the fuel container 1 was about 20 ml. After filling a 10% by weight of aqueous methanol solution in the fuel container through an air vent hole 15, the fuel cell was operated at the operation temperature of 50° C. and the load current of 200 mA to give an output voltage of 1.3 V. A continuous power generation was also carried out after filling with 20 ml of a 10% aqueous methanol solution at the load current of 200 mA to give a stable voltage for about 5 hours with an output voltage of 1.3 V. An output density of this cell was about 5.5 W/l and a volume energy density per litter fuel was about 28 Wh/l.

During the operation, no change in an output voltage or no pressure rise in a fuel container was observed even if the power generation equipment was operated in the positions of upside down or turning sideways.

Thus, a compact fuel cell of 1.3 volt class could be attained by mounting multiple fuel cells on one outer wall surface of a liquid fuel container, connecting in series with an interconnecter, and connecting the series cell groups mounted on multiple surfaces in parallel, without laminating with a separator in between. In this case, a power source was obtained without requiring any auxiliary equipment such as a fuel feed pump or a fan for cathode gas, by contacting an inner part of the container and an anode with a liquid fuel sucking material in an anode side and exposing a cathode to ambient air through a diffusion layer.

Further, shaking of the liquid fuel during operation could be reduced by filling inside of a fuel container with a low density fuel sucking material. In particular, by arranging air vent holes having a gas/liquid separation function on a plurality of surfaces of a fuel container, a normal power generation became possible at any position of a fuel cell, and essential characteristics for a portable power generation equipment could be attained.

EXAMPLE 3

In this Example, a fuel cell with a metal fuel container coated with epoxy resin as a platform will be described.

Figure 17:
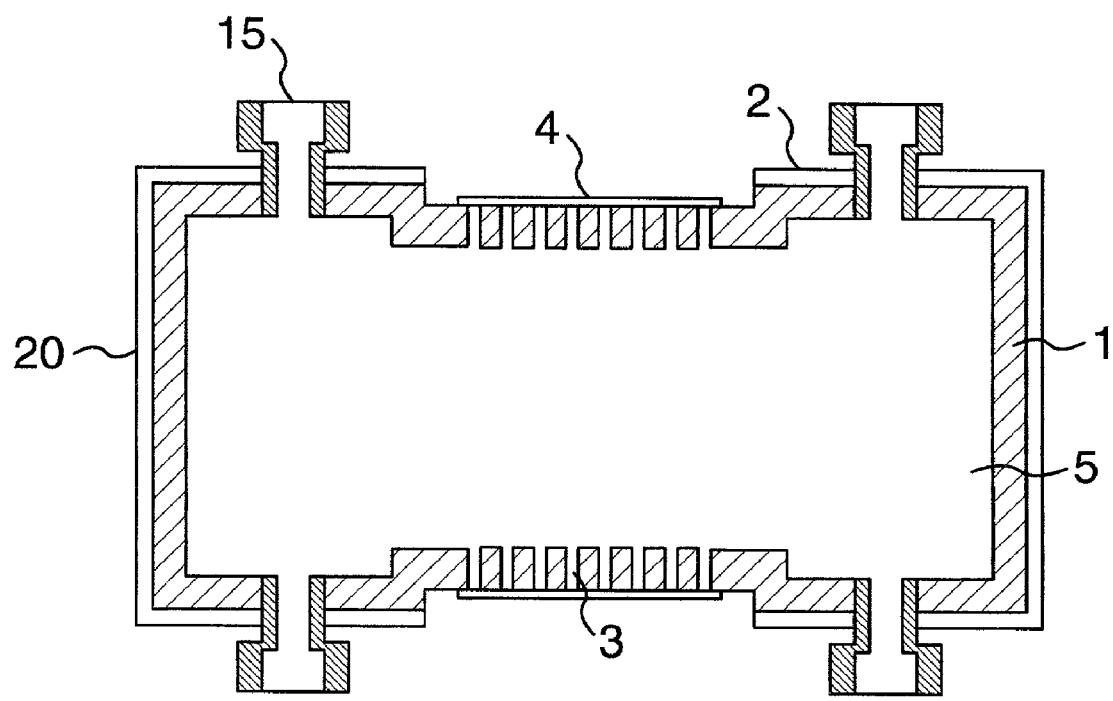
FIG. 17 is a cross-sectional drawing of a fuel container of Example 3.

MEA and a cathode side diffusion layer were prepared in the same way as in Example 2A. A fuel container made of SUS 304 was prepared with the outer dimensions of 22 mm width×79 mm length×23 mm height and the thickness of 0.3 mm, as shown in FIG. 17. The container is composed of a frame and an upper and a bottom lids having 4 faces of press formed fuel cell mounting parts 2 with the dimensions of 16 mm width×16 mm length×0.5 mm depth.

A slit of 0.5 mm width×10 mm length was provided by punching as a diffusion hole 3 in a part having the size of 10 mm width×10 mm length in the center of a fuel cell mounting part 2. Air vent holes 15 with an inner diameter of 1 mm made of SUS 304 were mounted without using a gas/liquid separation membrane in corner parts of an upper and a bottom lids. Using these parts, a fuel container 1 was prepared by weld-sealing, after filling the container with a fuel sucking material made of glass fiber mat having the porosity of about 80%.

An insulation layer 20 was formed by coating a liquid epoxy resin coating material (Flep from Toray Thiokol Co. Ltd.) on an outer surface of fuel container 1 in a thickness of 0.1 mm, followed by thermal curing. A surface of fuel cell mounting part 2 was electroless plated with nickel as an interconnecter 4 in an anode side in the same shape as in Example 2.

A slit of 1 mm width×10 mm length was provided using rigid poly(vinyl chloride) with the dimensions of 22 mm width×79 mm length×1 mm thickness in a fuel cell fixing plate similar to Example 2, in a surface contacting a cathode of each fuel cell in a rectangular direction to the slit in a fuel cell mounting part 2, and air vent holes 15 were also provided at the four corners. Using this slit, a cathode current collector 7 made of nickel with a slit having the thickness of 0.2 mm was mounted to connect to an interconnecter 4 in an anode side of an adjacent fuel cell.

The fuel cell of this Example was obtained, in the same way as in Example 2, by laminating anode side gasket made of fluorocarbon rubber, MEA, cathode side gasket made of fluorocarbon rubber, cathode side diffusion layer and fuel cell fixing plate in this order, and fixed to a fuel container by fastening a peripheral part of said fixing plate with a heat shrinkable 100 μm thick resin tube with a slit. Output terminals were obtained by connecting, each in series, an anode side terminals and a cathode side terminals mounted on an upper and a bottom sides of a fuel container.

Thus obtained fuel cell power generation equipment had the outer dimensions of 22 mm width×79 mm length×27 mm height and the power generation area of 1 cm$^2$, and composed of eight series of fuel cells. A volume of the fuel container was about 38 ml. After filling a 10% by weight of aqueous methanol solution as a fuel with a syringe through air vent holes of this fuel container, the fuel cell power generation equipment was operated at the operation temperature of 50° C. and the load current of 100 mA to give an output voltage of 2.6 V.

In addition, a continuous power generation was carried out at the load current of 100 mA after filling the fuel container with about 37 ml of a 10% by weight of aqueous methanol solution, a stable voltage was obtained at an output of 2.6 V for about 4 hours. An output density of this fuel cell power generation equipment under this condition was about 5.5 W/l and a volume energy density per litter fuel was about 22 Wh/l.

With this fuel cell, no change in an output voltage, no leakage of the liquid fuel or no pressure rise in a fuel container was observed even if the power generation equipment was operated in the positions of upside down or turning sideways.

Thus, a compact fuel cell of 2.6 volt class could be attained by mounting multiple fuel cells on one outer wall surface of a liquid fuel container, connecting in series with an interconnecter and connecting the series cell groups mounted on multiple surfaces in parallel, without laminating with a separator in between. In this case, a power source could be obtained without requiring any auxiliary equipment such as a fuel feed pump or a fan for cathode gas, by contacting an inner part of the container and an anode with a liquid fuel sucking material in an anode side and exposing a cathode to ambient air through a diffusion layer.

A fuel container of this Example was characterized in that a large volume can be obtained because the container is composed of a metal material with an insulation treated surface. In addition, it was also possible to prevent a leakage of liquid fuel and to provide a stable power generation in any position of the container during power generation by filling an inside of the container with a relatively low density of fuel sucking material and by providing only small open holes without having a gas/liquid separation function. It also became possible in production of said power generation equipment, to easily fix each fuel cell using a heat shrinkable resin tube.

EXAMPLE 4

In this Example, a polygonal cylinder type methanol fuel cell power generation equipment with a metal fuel container coated with epoxy resin as a platform will be described.

MEA with the outer dimensions of 24 mm width×29 mm length and the outer dimensions of electrode of 20 mm width×25 mm length was prepared in the same way as in Example 2. A cathode diffusion layer with the shape of 20 mm width×25 mm length was also prepared in the same way as in Example 2.

The fuel cell was a hexagonal cylinder having the dimensions of 28 mm side×190 mm height and the wall thickness of 0.3 mm, and composed of press formed fuel cell mounting part with the dimensions of 24 mm width×29 mm length×0.5 mm depth in each side and hexagonal upper and bottom lids.

Slits of 0.5 mm width×25 mm length were punched at the interval of 0.5 mm, in the central part of 20 mm width×25 mm length of a fuel cell mounting part. Six air vent holes having a gas/liquid separation function and the inner diameter of 2 mm were provided in peripheral parts of upper and bottom lids, as shown in FIG. 4. Upper and bottom lids were weld-sealed, after mounting a glass fiber mat having the thickness of 5 mm and the porosity of about 85% in an inner wall part of the hexagonal cylinder. An outer surface of a fuel container was coated with a liquid epoxy resin coating material (Flep from Toray Thiokol Co., Ltd.) in the thickness of 0.1 mm, followed by thermal curing and electroless plating with nickel as an interconnecter in an anode side, in the same shape as in Example 2.

Similar to Example 2, a fuel cell fixing plate 8 as a holding plate for a fuel cell was prepared using rigid poly(vinyl chloride) with the dimensions of 28 mm width×190 mm length×1 mm thickness, and a slit of 0.5 mm width×20 mm length was provided at the interval of 0.5 mm in its surface in contact with a cathode of each fuel cell in a rectangular direction to the slit in the notched part of fuel container. Using these slits, a cathode current collector made of nickel having slits with the thickness of 0.2 mm was mounted in order to connected to an interconnector in an anode side of an adjacent fuel cell.

Figure 18:
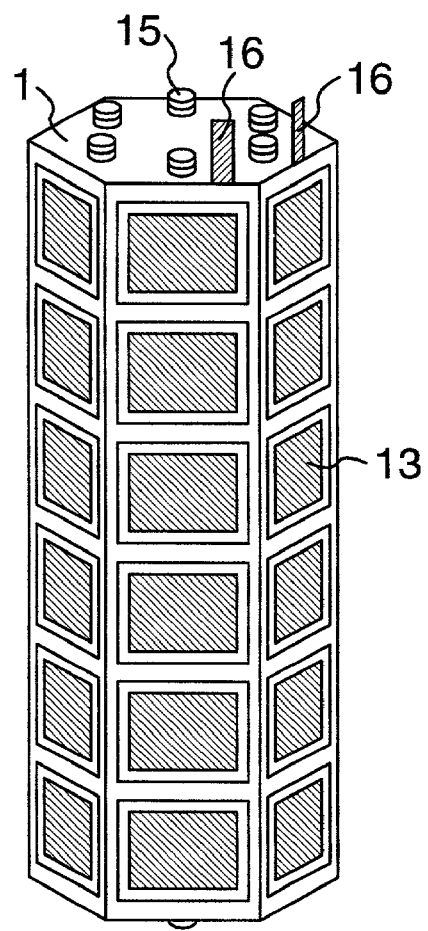
FIG. 18 is an appearance drawing of a fuel cell power generation equipment of Example 4.

The fuel cell of this Example was obtained, in the same way as in Example 2, by laminating anode side gasket made of fluorocarbon rubber, MEA, cathode side gasket made of fluorocarbon rubber, cathode side diffusion layer and fuel cell fixing plate in this order, and fixed to a fuel container by fastening a peripheral part of a fuel cell fixing plate with a heat shrinkable 100 μm thick resin tube with a slit. FIG. 18 shows thus obtained fuel cell power generation equipment.

On an outer wall of a hexagonal cylinder type fuel container 1 having six air vent holes each in an upper and a bottom parts, 36 unit cells 13 were mounted, which were each connected in series and output terminal 16 was taken out from the fuel container 1. Thus obtained fuel cell power generation equipment has hexagonal cylinder with the outer dimensions of about 28 mm side and about 190 mm height and the power generation area of 5 $cm^2$ and a direct current power generating equipment composed of 36 series. A volume of the fuel container was about 300 ml.

After filling a 10% by weight of aqueous methanol solution in a fuel container, a continuous power generation was carried out at the load current of 500 mA to give a stable voltage for about 4 hours at the output voltage of 12.1 V. An output density at this condition was about 15 W/l and a volume energy density per litter fuel was about 60 Wh/l.

With this fuel cell, no change in an output voltage, no leakage of the liquid fuel or no pressure rise in a fuel container was observed even if the power generation equipment was operated in the positions of upside down or turning sideways.

Thus, a compact fuel cell of 12 volt class could be attained by mounting multiple fuel cells on one outer wall surface of a liquid fuel container, connecting in series with an interconnecter and connecting the series cell groups mounted on multiple surfaces in parallel, without laminating with a separator in between. In this case, a power source could be obtained without requiring any auxiliary equipment such as a fuel feed pump or a fan for cathode gas, by contacting an inner part of the container and an anode with a liquid fuel sucking material in an anode side and exposing a cathode to ambient air through a diffusion layer.

This Example is characterized in that an output was improved by providing a comparatively large power generation area, and it becomes possible to obtain a stable power generation in any position of the container during operation. In addition, it also became possible in production of said power generation equipment, to easily fix each fuel cell using a heat shrinkable resin tube.

EXAMPLE 5

A square type high output power generation equipment using a aqueous methanol solution as a fuel will be described. As an anode layer, a porous membrane of about 20 μm thickness was formed by screen printing of a slurry, which was prepared by mixing catalyst powder of 50% by weight of fine particles of platinum/ruthenium alloy, in the atomic ratio of platinum/ruthenium being 1/1, dispersed and supported on carbon carrier, 30% by weight of perfluorocarbone sulfonic acid electrolyte (Nafion 117) as a binder and a water/alcohol mixed solvent (water:isopropanol:n-propanol is 20:40:40, ratio by weight).

As a cathode layer, a porous membrane of about 25 μm thick was formed with a roll method using a slurry, which was prepared by mixing catalyst powder of 50% by weight of fine particles of platinum supported on carbon carrier and an aqueous dispersion of polytetrafluoroethylene as a binder, so that the ratio by dry weight became 25% by weight. This cathode layer was fired in air at 290° C. for one hour to decompose a surfactant in the aqueous dispersion.

Thus prepared anode and cathode porous membranes were cut out each in the size of 16 mm width×56 mm length to obtain an anode and a cathode.

Then, Nafion 117 electrolyte membrane with the thickness of 50 μm was cut out in the size of 120 mm width×180 mm length, and about 0.5 ml of a 5% by weight aqueous alcohol solution of Nafion 117 (from Fluka Chemika Ltd.) was penetrated to anode layer surface, followed by joining and drying at 80° C. for 3 hours under the load of about 1 kg. Then, a surface of cathode layer was penetrated with a 10% by weight aqueous alcohol solution of Nafion 117 (from Fluka Chemika Ltd.), so that the solution became 25% by weight based on dry weight of the cathode, followed by joining so as to overlap with an anode layer joined in advance, drying at 80° C. for 3 hours under the load of about 1 kg to prepare MEA.

A fuel container had the outer dimensions of 28 mm width×128 mm length×24 mm height and was prepared by adhering rigid poly(vinyl chloride) with the wall thickness of 2 mm using an adhesives. Similar to Example 2, 18 notches with the dimensions of 16 mm width×56 mm length×0.1 mm depth were provided for fuel cell mounting in an outer wall of this hexahedron container.

Slits of 0.5 mm width×16 mm length were provided at the interval of 0.5 mm in the central part of 16 mm width×56 mm length in a fuel cell mounting part. Eight air vent holes with a gas/liquid separation function and the inner diameter of 2 mm, the same as in FIG. 4A, were provided at four corners of two maximum surfaces of a fuel container.

An electroless nickel plated metalizing layer with the thickness of about 50 μm was formed as an interconnector in an anode side in a notched part for fuel cell mounting in order to electrically connect in series to an adjacent fuel cell in the same way as in Example 2. Slits of 0.5 mm width×56 mm length were also provided at the interval of 0.5 mm, in the part of a fuel cell mounting plate contacting to a cathode in matching size with each outer wall surface of a fuel container in the same way as in Example 2.

Further, a cathode current collector with a slit was mounted on a fuel cell fixing plate. Output terminals connected in series were taken out from 18 fuel cells mounted on an outer wall surface of a fuel container by a cathode current collector adjacent to an interconnector in an anode side.

Figure 19:
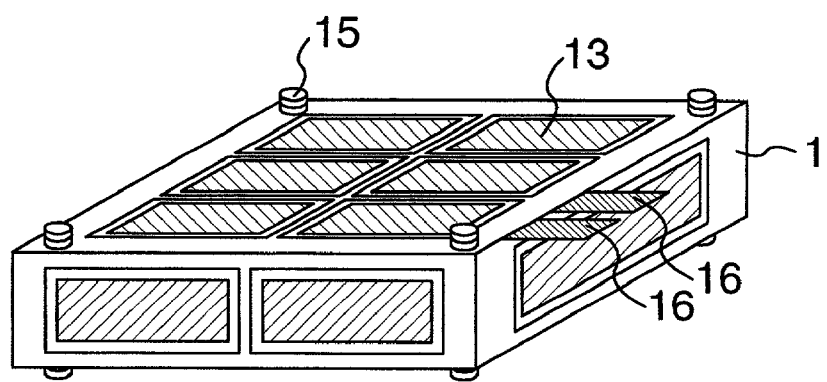
FIG. 19 is an appearance drawing of a fuel cell power generation equipment of Example 5.

Thus obtained parts were laminated in the order of an anode side gasket and MEA, and peripheral part of each fuel cell in a fuel cell mounting plate and peripheral part of a fuel container were joined with an adhesive. Thus obtained fuel cell power generation equipment was a direct current power generation equipment having the outer dimensions of about 28 mm width×128 mm length×28 mm height as shown in FIG. 19, mounted with 18 series of unit cells 13 with the power generation area of about 9 $cm^2$ on a wall surface of a fuel container 1, and having output terminals 16 and eight air vent holes 5 with a gas/liquid separation function, at an upper and a bottom surfaces. A inside volume of the fuel container was about 59 ml.

After filling about 55 ml of a 10% by weight of aqueous methanol solution in the fuel container, a continuous power generation was carried out at the load current of 1A, to give a stable voltage for about 45 minutes at an output of 6.1 V.

With this fuel cell, no change in an output voltage, no leakage of the liquid fuel or no pressure rise in a fuel container was observed even if the power generation equipment was operated in the positions of upside down or turning sideways.

Thus, a compact fuel cell of 6 volt class could be attained by mounting multiple fuel cells on one outer wall surface of a liquid fuel container, connecting in series with an interconnecter and connecting the series cell groups mounted on multiple surfaces in parallel, without laminating with a separator in between. In this case, a power source could be obtained without requiring any auxiliary equipment such as a fuel feed pump or a fan for cathode gas, by contacting an inner part of the container and an anode with a liquid fuel sucking material in an anode side and exposing a cathode to ambient air through a diffusion layer.

This example enables a structure with a reduced number of component parts without lowering performance even if a diffusion layer is omitted, by giving a water repellency to a cathode catalyst layer by dispersing polytetrafluoroethylene to make a diffusion of water formed easy.

The above description was made with reference to Examples, however, it is apparent to those skilled in the art that various changes and modifications may be done in the present invention within the spirit of the invention and the spirit and scope of the attached claims.

The present invention is characterized in that a container for a liquid fuel is used as a platform, fuel cells are mounted on its wall surface, and said cells are electrically connected in series or in a combination of series and parallel.

Fuel cells are mounted on a fuel container as a platform and liquid fuel is sucked up and fed to each fuel cell by capillary force, by filling a liquid fuel holding material in said container.

Oxygen (an oxidizing agent) in air is fed through a diffusion hole in each fuel cell having power generation part in an outer circumferential surface. By this, a fuel cell having a simple system without requiring auxiliary equipment for feeding fuel and an oxidizing agent can be realized.

By using an aqueous methanol solution having a high volume energy density as a liquid fuel, a longer time of power generation per litter fuel can be attained compared with the case using hydrogen as a fuel, and a continuous power generation equipment without requiring charging such as conventional secondary battery, can be obtained by sequential feeding of a fuel.

Furthermore, by mounting fuel cells on multiple wall surfaces of a fuel container and providing multiple air vent holes having a gas/liquid separation function on the wall surfaces, a power generation equipment providing stable and continuous power generation in any position of the fuel container can be attained.

What is claimed is:

1. A fuel cell power generation equipment using liquid as a fuel and comprising fuel cells in which an anode and a cathode are formed with an electrolyte membrane in between, wherein:
   one or more air vent holes are provided on a wall surface of a fuel container, multiple fuel cells are mounted on the wall surface of the fuel container, mounting parts of the fuel container on which the fuel cells are mounted have diffusion holes,
   the fuel cells are mounted on an outer wall surface of the mounting part so that the anode of the fuel cell opposes the outer wall surface of the mounting part, between the outer wall surface of the mounting part and the anode of the fuel cell, an interconnector for electrically connecting the anode with an adjacent fuel cell is provided, and
   the interconnector has a diffusion hole.

2. A fuel cell power generation equipment using liquid as a fuel and comprising fuel cells in which an anode and a cathode are formed with an electrolyte membrane in between, wherein:
   one or more air vent holes are provided on a wall surface of a fuel container, multiple fuel cells are mounted on the wall surface of the fuel container, mounting parts of the fuel container on which the fuel cells are mounted have diffusion holes,
   the fuel cells are mounted on an outer wall surface of the mounting part so that the anode of the fuel cell opposes the outer wall surface of the mounting part, between the outer wall surface of the mounting part and the anode of the fuel cell, an interconnector for electrically connecting the anode with an adjacent fuel cell is provided,
   the interconnector has a diffusion hole,
   the interconnector is connected to a cathode of the adjacent fuel cell,
   the fuel cell power generation equipment further comprises a cathode current collector, and
   the cathode current collector has a diffusion hole.

3. The fuel cell power generation equipment according to claim 1, wherein a gas/liquid separation membrane is provided in the air vent hole.

4. The fuel cell power generation equipment according to claim 1, wherein the air vent hole has a role of a fuel feed hole.

5. The fuel cell power generation equipment according to claim 4, wherein the gas/liquid separation membrane is a water repellent porous membrane.

6. The fuel cell power generation equipment according to claim 1, wherein a diffusion layer is provided in contact with the anode and/or the cathode.

7. The fuel cell power generation equipment according to claim 1, wherein the fuel container contains a liquid fuel holding material.

8. The fuel cell power generation equipment according to claim 1, wherein a liquid fuel container is composed of an electrically insulating material.

9. The fuel cell power generation equipment according to claim 1, wherein at least the outer wall surface of the fuel container is treated for an electrical insulation.

10. The fuel cell power generation equipment according to claim 1, wherein the liquid fuel is an aqueous methanol solution.

* * * * *